United States Patent
Lee et al.

(10) Patent No.: US 11,113,544 B2
(45) Date of Patent: Sep. 7, 2021

(54) METHOD AND APPARATUS PROVIDING INFORMATION FOR DRIVING VEHICLE

(71) Applicant: SAMSUNG ELECTRONICS CO., LTD., Suwon-si (KR)

(72) Inventors: Wonju Lee, Suwon-si (KR); Jahoo Koo, Seoul (KR); Dong Wook Lee, Hwaseong-si (KR); Jaewoo Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 187 days.

(21) Appl. No.: 16/142,257

(22) Filed: Sep. 26, 2018

(65) Prior Publication Data

US 2019/0251373 A1    Aug. 15, 2019

(30) Foreign Application Priority Data

Feb. 12, 2018    (KR) .................. 10-2018-0016904

(51) Int. Cl.
*G06K 9/00*    (2006.01)
*G01C 21/36*    (2006.01)
(Continued)

(52) U.S. Cl.
CPC ..... *G06K 9/00798* (2013.01); *G01C 21/3602* (2013.01); *G01C 21/3658* (2013.01); *G05D 1/0231* (2013.01); *G06K 9/6202* (2013.01); *G06K 9/6267* (2013.01); *G06T 7/11* (2017.01); *G06T 7/50* (2017.01); *G06T 7/73* (2017.01); *G08G 1/167* (2013.01); *G05D 2201/0213* (2013.01); *G06T 2207/30241* (2013.01); *G06T 2207/30244* (2013.01); *G06T 2207/30256* (2013.01)

(58) Field of Classification Search
None
See application file for complete search history.

(56) References Cited

U.S. PATENT DOCUMENTS 7,548,813 B2    6/2009    Komatsu
8,064,643 B2    11/2011    Stein et al.
(Continued)

FOREIGN PATENT DOCUMENTS

JP    5187171 B2    4/2013
JP    6079784 B2    2/2017
KR    10-1573764 B1    12/2015

OTHER PUBLICATIONS

Communication dated May 24, 2019, issued by the European Patent Office in counterpart European Application No. 18203797.8.
(Continued)

*Primary Examiner* — Wei Wen Yang
(74) *Attorney, Agent, or Firm* — Sughrue Mion, PLLC

(57) ABSTRACT

Disclosed is a method and apparatus for providing information for driving of a vehicle, the method includes detecting a lane region including lane demarcation lines from a driving image, determining curvature information of a road on which a vehicle is driving based on map information, estimating a lateral offset of the vehicle based on the detected lane region and a reference line having the curvature information, and outputting a signal including information for driving the vehicle based on the curvature information and the lateral offset.

23 Claims, 20 Drawing Sheets

(51) Int. Cl.
*G08G 1/16* (2006.01)
*G06T 7/50* (2017.01)
*G06T 7/11* (2017.01)
*G06T 7/73* (2017.01)
*G05D 1/02* (2020.01)
*G06K 9/62* (2006.01)

(56) References Cited

U.S. PATENT DOCUMENTS

| | | | |
|---|---|---|---|
| 8,275,497 B2 | 9/2012 | Koch-Groeber et al. |
| 8,447,519 B2 | 5/2013 | Basnayake et al. |
| 8,457,827 B1 | 6/2013 | Ferguson et al. |
| 8,700,229 B2 | 4/2014 | Seger |
| 8,827,514 B2 | 9/2014 | Takagaki |
| 8,912,978 B2 | 12/2014 | Szczerba et al. |
| 9,090,260 B2 | 7/2015 | Clarke et al. |
| 9,233,688 B2 | 1/2016 | Clarke et al. |
| 9,482,536 B2 | 11/2016 | Mian et al. |
| 2010/0104199 A1 | 4/2010 | Zhang et al. |
| 2010/0292886 A1 | 11/2010 | Szczerba et al. |
| 2015/0125039 A1 | 5/2015 | Wu |
| 2016/0350606 A1* | 12/2016 | Yoshitomi .......... G06K 9/00818 |
| 2017/0016740 A1 | 1/2017 | Cui et al. |
| 2017/0116477 A1 | 4/2017 | Chen et al. |
| 2017/0177951 A1 | 6/2017 | Yang et al. |
| 2017/0248958 A1 | 8/2017 | Smith et al. |
| 2019/0258251 A1* | 8/2019 | Ditty .................... G05D 1/0274 |
| 2020/0317192 A1* | 10/2020 | Awane .................. B60W 30/12 |

OTHER PUBLICATIONS

Dominique Gruyer et al., "Map-aided localization with lateral perception", 2014 IEEE Intelligent Vehicles Symposium Proceedings, IEEE, Jun. 8, 2014 (Jun. 8, 2014), XP032620378, pp. 674-680, (7 pages total).

* cited by examiner

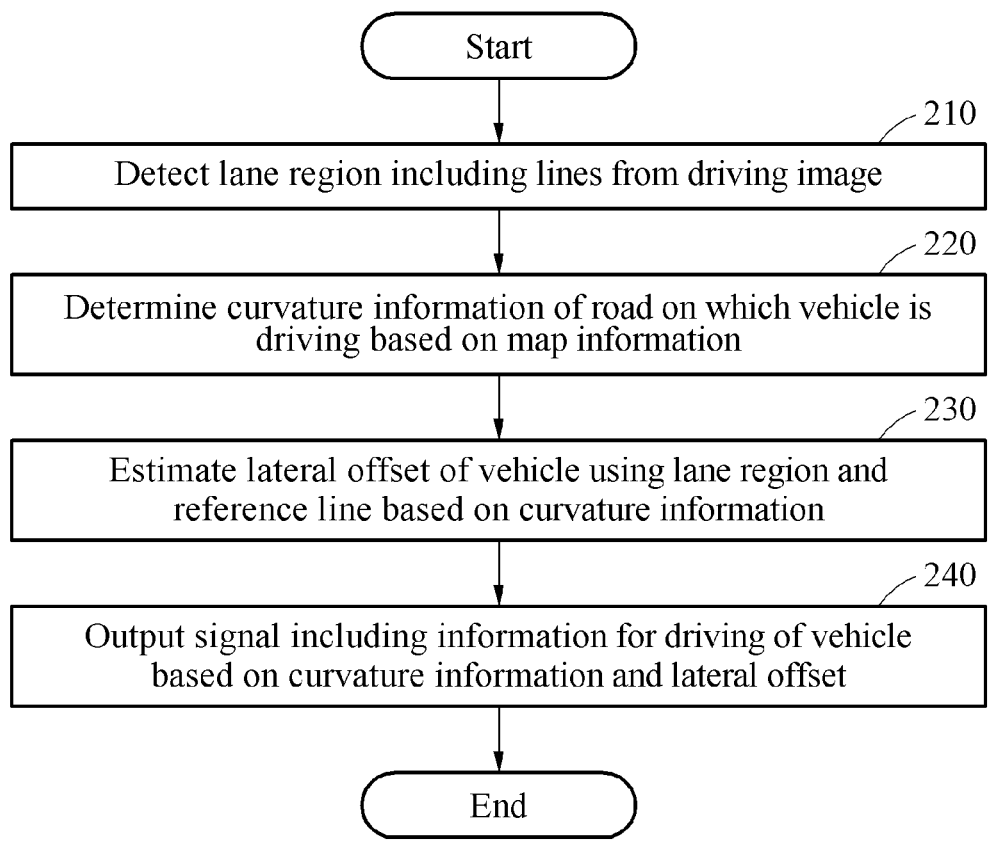

FIG. 16A
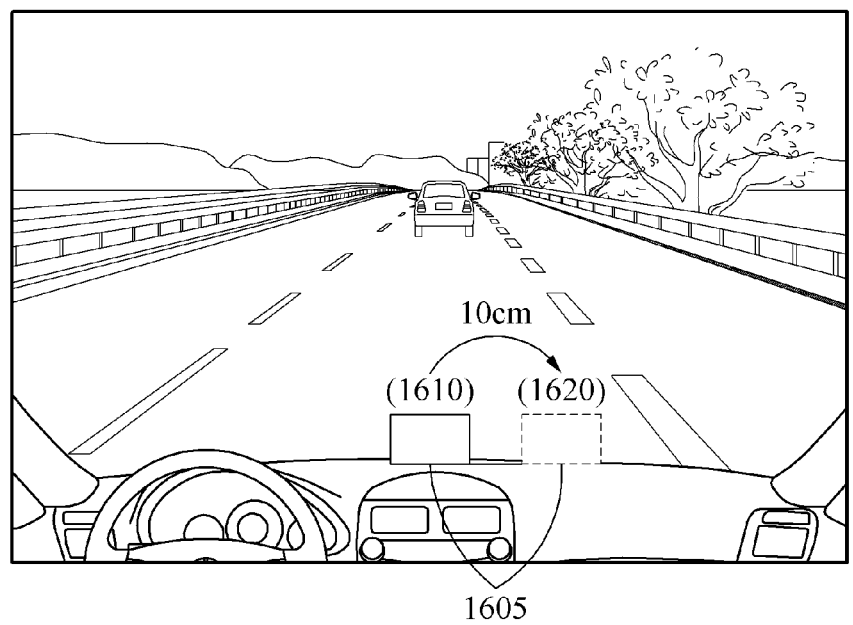
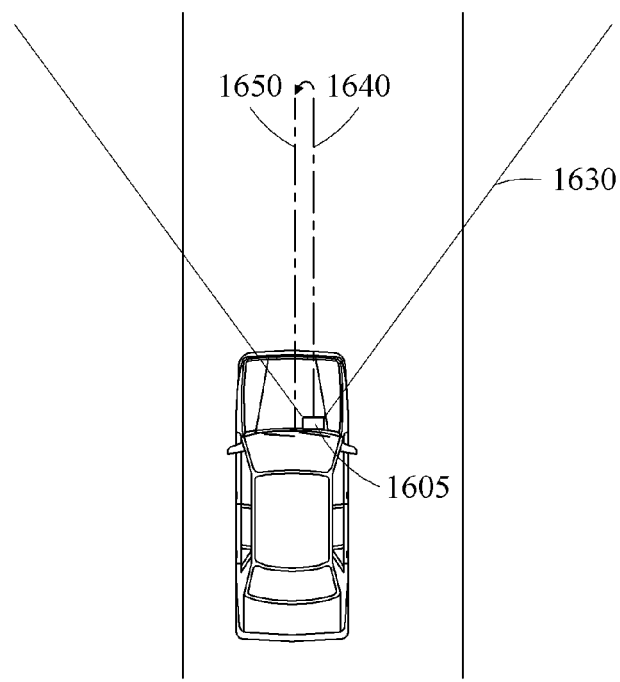

METHOD AND APPARATUS PROVIDING INFORMATION FOR DRIVING VEHICLE

CROSS-REFERENCE TO RELATED APPLICATION

This application claims the benefit under 35 USC § 119(a) of Korean Patent Application No. 10-2018-0016904 filed on Feb. 12, 2018 in the Korean Intellectual Property Office, the entire disclosure of which is incorporated herein by reference for all purposes.

BACKGROUND

1. Field

This application relates to a method and apparatus providing information for driving of a vehicle.

2. Description of Related Art

Visual information augmentation technologies are provided to assist the steering of a vehicle and other transportation means. In such technology, various methods may be used to extract a lane marking or road information from a driving image.

For example, when pixel information related to an image that is located at an extended distance from the vehicle is insufficient, when a lane marking is obscured by an object in a road environment, when a change in brightness or contrast occurs in an image due to a change in time from day to night, or due to a change in weather such as snow and rain, or when image information is insufficiently or inaccurately acquired due to the shape or curvature of the road (for example, a ramp) or a change in altitude, it may be difficult to accurately detect a lane marking. When accurate lane detection is not performed, difficulties may arise in providing accurate information for driving of the vehicle such as vehicle control or route determination, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a method includes detecting a lane region including lane demarcation lines from a driving image, determining curvature information of a road on which a vehicle is driving based on map information, estimating a lateral offset of the vehicle based on the detected lane region and a reference line having the curvature information, and outputting a signal including information for driving the vehicle based on the curvature information and the lateral offset.

The detecting of the lane region may include classifying an object included in the driving image, generating a segmentation image in which the object included in the driving image is classified, and detecting the lane region from the generated segmentation image.

The determining of the curvature information may include determining a current location of the vehicle, and determining the curvature information based on a plurality of waypoints corresponding to the current location of the vehicle on a map.

The determining of the curvature information based on the waypoints may include selecting the waypoints within a look-ahead distance from the current location.

The determining of the curvature information based on the waypoints may include recognizing a shape of the road on the map based on the waypoints, and determining the curvature information based on the shape of the road on the map.

The recognizing of the shape of the road on the map may include obtaining a regression function expressing the shape of the road on the map with a linear regression analysis on the waypoints.

The look-ahead distance may be determined based on any one or any combination of a speed of the vehicle, a visible distance, a weather condition, a driving condition, and a condition of the road.

The determining of the curvature information may include selecting, when the road on which the vehicle is driving includes a plurality of lanes, one of the lanes based on destination information of the vehicle; and determining curvature information of a road corresponding to the selected lane.

The estimating of the lateral offset of the vehicle may include converting an image of the lane region into a top-view image, calculating polynomial fitting scores of lines included in the top-view image with respect to the reference line, and estimating a lateral offset of the vehicle based on the polynomial fitting scores.

The calculating of the polynomial fitting scores may include calculating, while moving the reference line by a predetermined number of pixel units, candidate fitting scores in response to the reference line being moved, by counting a number of matching pixels between the lines included in the top-view image and the reference line.

The calculating of the candidate fitting scores may include moving the reference line by the predetermined number of pixel units, counting a number of matching pixels between the lines included in the top-view image and the reference line moved by the predetermined number of pixel units, and calculating a candidate fitting score associated with the moved reference line based on the number of matching pixels.

The estimating of the lateral offset of the vehicle may include detecting lines based on the polynomial fitting scores, and calculating the lateral offset based on the detected lines and a lateral position of the vehicle in the top-view image.

The detecting of the lines may include determining at least one polynomial fitting score corresponding to each line among the fitting scores based on a threshold, and detecting a corresponding line based on the at least one polynomial fitting score corresponding to each line.

The detecting of the corresponding line may include detecting a polynomial fitting score having a highest value from at least one polynomial fitting score of the corresponding line, and determining the corresponding line based on offset information corresponding to the detected polynomial fitting score.

The detecting of the corresponding line may include obtaining a weighted sum of at least one item of offset information corresponding to the at least one polynomial fitting score based on at least one polynomial fitting score of the corresponding line as a weight, and determining the corresponding line based on the weighted sum.

The calculating of the lateral offset may include determining a center line between left and right lines adjacent to the lateral position of the vehicle, and calculating a distance between the center line and the lateral position of the vehicle.

The lateral position of the vehicle in the top-view image may include a laterally central position of the top-view image.

The lateral position of the vehicle in the top-view image may be determined based on a lateral position of a camera attached to the vehicle to capture the driving image.

The outputting of the signal including the information for the driving the vehicle may include determining a local lane of the vehicle based on the curvature information and the lateral offset, and generating a signal for controlling the driving of the vehicle based on the local lane.

The outputting of the signal including the information for the driving of the vehicle may include determining a local lane of the vehicle based on the curvature information and the lateral offset, and providing driving information including a driving lane of the vehicle based on the local lane.

The method may include acquiring the driving image, and acquiring the map information.

In a general aspect, a method of detecting a line includes detecting a lane region including lane demarcation lines from a driving image, determining curvature information of a road on which a vehicle is driving based on map information, and detecting a line based on the lane region and a reference line based on the curvature information.

The detecting of the lane region may include classifying an object included in the driving image, generating a segmentation image in which the object included in the driving image is classified, and detecting the lane region from the generated segmentation image.

The determining of the curvature information may include determining a current location of the vehicle, and determining a current location of the vehicle.

The determining of the curvature information based on the waypoints may include selecting the waypoints within a look-ahead distance from the current location.

The determining of the curvature information based on the waypoints may include recognizing a shape of the road on the map based on the waypoints, and determining the curvature information based on the shape of the road on the map.

The recognizing of the shape of the road on the map may include obtaining a regression function expressing the shape of the road on the map with a linear regression analysis on the waypoints.

The look-ahead distance is determined based on any one or any combination of a speed of the vehicle, a visible distance, a weather condition, a driving condition, and a condition of the road.

The determining of the curvature information may include selecting, when the road on which the vehicle is driving includes a plurality of lanes, one of the lanes based on destination information of the vehicle, and determining curvature information of a road corresponding to the selected lane.

The detecting of the line may include converting an image of the lane region into a top-view image, calculating polynomial fitting scores of lines included in the top-view image with respect to the reference line, and detecting the line based on the fitting scores.

The calculating of the polynomial fitting scores may include calculating, while moving the reference line by a predetermined number of pixel units, candidate fitting scores in response to the reference line being moved by counting a number of matching pixels between the reference line and lines included in the top-view image.

The calculating of the candidate fitting scores may include moving the reference line by the predetermined number of pixel units, counting a number of matching pixels between the lines included in the top-view image and the reference line moved by the predetermined number of pixel units, and determining the curvature information based on the shape of the road on the map.

The recognizing of the shape of the road on the map may include obtaining a regression function expressing the shape of the road on the map with a linear regression analysis on the waypoints.

The look-ahead distance is determined based on any one or any combination of a speed of the vehicle, a visible distance, a weather condition, a driving condition, and a condition of the road.

The determining of the curvature information may include selecting, when the road on which the vehicle is driving includes a plurality of lanes, one of the lanes based on destination information of the vehicle, and determining curvature information of a road corresponding to the selected lane.

The detecting of the line may include converting an image of the lane region into a top-view image, calculating polynomial fitting scores of lines included in the top-view image with respect to the reference line, detecting the line based on the fitting scores.

The calculating of the polynomial fitting scores may include calculating, while moving the reference line by a predetermined number of pixel units, candidate fitting scores in response to the reference line being moved by counting a number of matching pixels between the reference line and lines included in the top-view image.

The calculating of the candidate fitting scores may include moving the reference line by the predetermined number of pixel units, counting a number of matching pixels between the lines included in the top-view image and the reference line moved by the predetermined number of pixel units, and calculating a candidate fitting score associated with the moved reference line based on the number of matching pixels.

The detecting of the line based on the polynomial fitting scores may include determining at least one fitting score corresponding to each line among the fitting scores based on a threshold, and detecting a corresponding line based on the at least one fitting score corresponding to each line.

The detecting of the corresponding line may include detecting a fitting score having a highest value from at least one fitting score of the corresponding line, and deter mining the corresponding line based on offset information corresponding to the detected fitting score.

The detecting of the corresponding line may include obtaining a weighted sum of at least one item of offset information corresponding to the at least one fitting score based on at least one fitting score of the corresponding line as a weight, and determining the corresponding line based on the weighted sum.

The method may include acquiring the driving image, and acquiring the map information.

In a general aspect, an apparatus includes a processor configured to detect a lane region including lane demarcation lines from a driving image, determine curvature information of a road on which a vehicle is driving based on map information, estimate a lateral offset of the vehicle based on the lane region and a reference line having the curvature information, and output a signal including information for driving the vehicle based on the curvature information and the lateral offset.

In a general aspect, an apparatus for detecting a line includes a processor configured to detect a lane region including lane demarcation lines from a driving image, determine curvature information of a road on which a vehicle is driving based on map information, and detect a lane demarcation line using the lane region and a reference line based on the curvature information.

In a general aspect, a method includes detecting a lane region on a road with a camera sensor, determining curvature information of the road based on a plurality of single-lane waypoints within a current location of a vehicle and a location a predetermined distance ahead of the vehicle, determining an offset of the vehicle from a center of the lane region based on the curvature information, and controlling driving of the vehicle based on the determined offset and the curvature information.

The offset may be a distance between a center of the vehicle and a center line of the road.

The curvature information may be obtained by performing a linear regression analysis on the plurality of waypoints.

Other features and aspects will be apparent from the following detailed description, the drawings, and the claims.

BRIEF DESCRIPTION OF THE DRAWINGS

FIG. 2 illustrates an example of a method of providing information for driving of a vehicle.

FIGS. 16A and 16B illustrate examples of a method of estimating a lateral offset of a vehicle when a camera is attached to be spaced apart from a center of the vehicle.

Figure 1A:
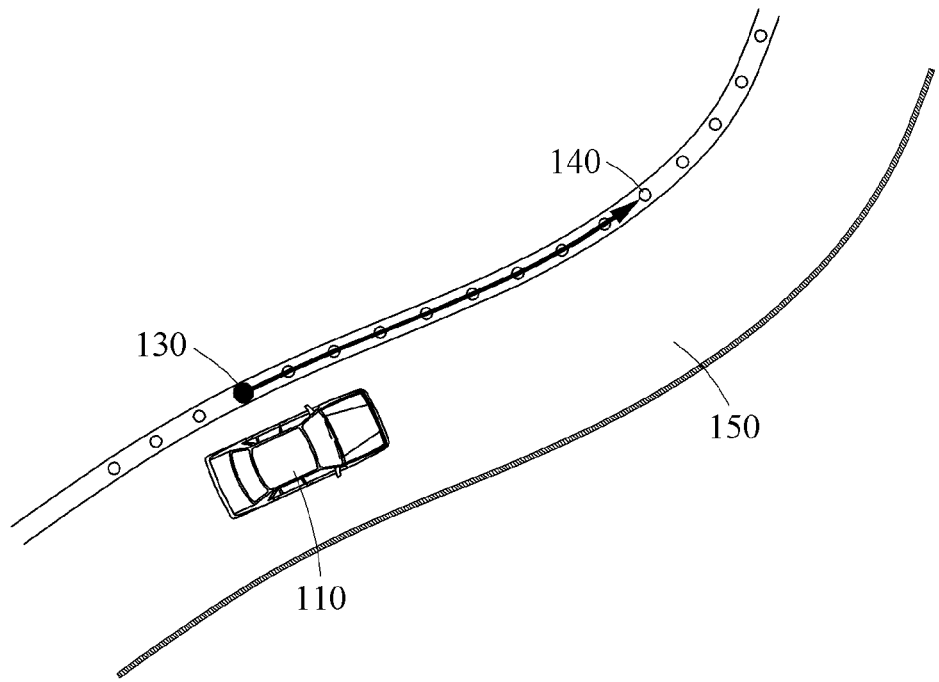
FIGS. 1A and 1B illustrate examples of a method of providing information for driving of a vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below"

or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains, in view of the disclosure of this application. Terms, such as those defined in commonly used dictionaries, are to be interpreted as having a meaning that is consistent with their meaning in the context of the relevant art, in view of the disclosure of this application and are not to be interpreted in an idealized or overly formal sense unless expressly so defined herein.

Examples set forth hereinafter may be used to display a virtual route or generate visual information to assist in the steering or driving of, or by, an autonomous vehicle of, or in, an augmented reality (AR) navigation system of a smart vehicle. The examples may be used to interpret visual information and assist in the safe and pleasant driving by or in a device including an intelligent system such as a head-up display (HUD) installed for driving assistance or fully autonomous driving of a vehicle. The examples may be or be applied to, for example, an autonomous vehicle, an intelligent vehicle, a smart phone, and a mobile device, but is not limited thereto. Hereinafter, the examples will be described in detail with reference to the accompanying drawings, wherein like drawing reference numerals are used for like elements.

FIG. 1 illustrates an example of a method of providing information for driving of a vehicle.

In an autonomous driving system, a polynomial equation including an offset from a center of a road and a curvature of the road may be selected and used to generate a local path to maintain a position in a lane, or to perform a lane change. The vehicle or other apparatus providing information for driving of the vehicle (hereinafter, also commonly referred to as "information providing apparatus") may extract curvature information of a road from map information. The information providing apparatus may use the curvature information of the road when detecting a lateral offset based on lines or lane markings from a driving image. Using the curvature information, the information providing apparatus may stably provide information for driving of a vehicle and accurately perform line detection and lateral offset estimation even when it is difficult to detect accurate information from a driving image (for example, when pixel information of a distant image is insufficient, when a line is covered by various objects, and when a detectable line distance decreases when driving at high speeds).

It is noted that use of the term "may" herein with respect to an example or embodiment, e.g., as to what an example or embodiment may include or implement, means that at least one example or embodiment exists where such a feature is included or implemented while all examples and embodiments are not limited thereto.

FIG. 1A illustrates a plurality of waypoints 130, . . . , 140 corresponding to a current location of a vehicle 110 on a map. The plurality of waypoints 130, . . . , 140 corresponds to points of a road 150 on the map. In this example, the road 150 corresponds to a road on which the vehicle 110 is driving.

The information providing apparatus determines curvature information of the road 150 on which the vehicle 110 is driving based on the plurality of waypoints 130, . . . , 140 within a look-ahead distance between the waypoint 130 adjacent to a current location of the vehicle and a waypoint 140 on the map. The waypoint 140 may be located a defined or provided distance from the waypoint 130 in a position ahead of the vehicle 110. The term "look-ahead distance" may refer to a distance to be used to generate information for driving the vehicle 110, and is determined based on, for example, any one or any combination of a speed of the vehicle 110, a defined or provided visible distance, weather conditions, driving conditions, road conditions, and a destination of the vehicle 110. Additionally, the look-ahead distance may correspond to a distance that appropriately represents the plurality of waypoints 130, . . . , 140 based on a degree of a line regression function, for example, a polynomial equation.

The information providing apparatus generates or obtains a regression function expressing a shape of the road 150 on the map through a linear regression analysis on the plurality of waypoints 130, . . . , 140. The information providing apparatus may determine the curvature information of the road 150 using the regression function.

Figure 1B:
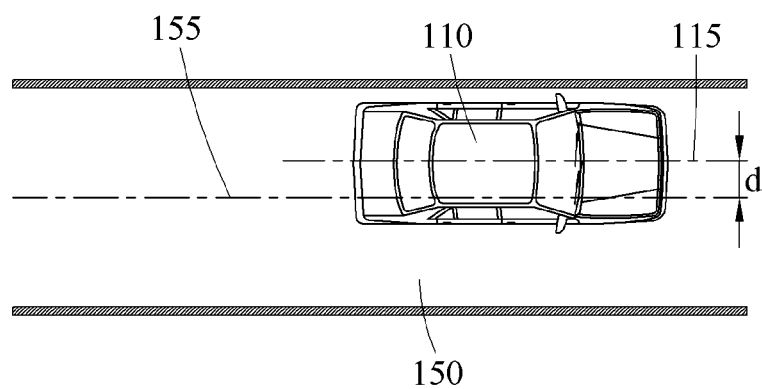

Referring to FIG. 1B, in an example, the information providing apparatus may detect a lane region including lane demarcation lines from a driving image acquired using a camera attached to the vehicle 110, and estimate a lateral offset of the vehicle using the lane region and a reference line which is formed from the curvature information. In an example, the lateral offset of the vehicle 110 corresponds to a distance d between a center 115 of the vehicle 110 and a center line 155 of the road 150.

A method of providing information for driving of a vehicle based on a lane region detected from a driving image and road curvature information acquired from map information will be described with reference to FIGS. 2 through 15. Additionally, a method of detecting a line based on a lane region detected from a driving image and road curvature information acquired from map information will be described with reference to FIGS. 16A through 18.

Herein, the term "vehicle" refers to a vehicle driving on a road and includes, for example, an autonomous or automated driving vehicle, and an intelligent or smart vehicle equipped with an advanced driver assistance system (ADAS). However, the vehicle is not limited thereto. The term "road" refers to a surface on which vehicles drive, and includes various types of roads such as, for example, a highway, a national road, a rural road, a local road, an expressway, and a motorway. The road includes one or more lanes. The term "lane" refers to a specific designated space or region on the road that is distinguished, e.g., by lines marked on a surface of the road. A single lane is distinguished by left and right lines thereof.

The "lines" are various types of indicators or lines, for example, solid lines, broken lines, curved lines, and zigzag lines marked in colors such as white, blue or yellow on the surface of the road. The term "lane region" includes a region including lines or a region corresponding to the lines in a driving image.

FIG. 2 illustrates an example of a method of providing information for driving of a vehicle. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions.

In addition to the description of FIG. 2 below, the descriptions of FIGS. 1A and 1B are also applicable to FIG. 2, and are incorporated herein by reference. Thus, the above description may not be repeated here. Also, FIG. 2 will be described below with respect to an information providing apparatus, such as corresponding to the information providing apparatus of any of FIGS. 1A and 1B.

Referring to FIG. 2, in operation 210, an information providing apparatus detects a lane region of a road including lines from a driving image. The information providing apparatus acquires the driving image using, for example, an included image capture device mounted on the vehicle. The vehicle may correspond to the vehicle 110 of FIG. 1. The driving image includes a single driving image or a plurality of driving images. The image capture device may be attached at a predetermined position, for example, a windshield, a dashboard, and a rear-view mirror of the vehicle to capture a driving image of a front scene from the vehicle. However, the location of the image capture device is not limited thereto. The image capture device includes, for example, a vision sensor, an image sensor, or a device that performs a similar function. The image capture device may capture a single image or may capture an image for each of multiple frames. The driving image is captured by an image capture device included in the information providing apparatus or a device other than the information providing apparatus. The driving image may be, for example, a driving image 1310 of FIG. 13A.

In an example, in operation 210, the information providing apparatus detects the lane region by classifying pixels corresponding to line components or road components in the driving image based on a deep learning scheme of a neural network or through other machine learning models. A method of detecting a lane region using the information providing apparatus will be further described with reference to FIG. 3.

In operation 220, the information providing apparatus determines curvature information of a road on which the vehicle is driving based on map information. The map information includes, for example, a map representing geographic features on the earth using symbols, characters, and images, map coordinates including latitudes, longitudes, and altitudes of the geographic features, and a plurality of waypoints on a path represented on the map. Here, the plurality of waypoints may be a set of coordinates obtained at preset intervals when the vehicle drives in a single lane on a road. The map information corresponds to map information at a level of a general map or map information at a level of a general navigation. The map information may be stored in a memory (for example, a memory 1940 of FIG. 19) of the information providing apparatus, or may be received from an external source of the information providing apparatus through a communication interface (for example, a communication interface 1920 of FIG. 19) of the information providing apparatus.

In operation 220, the information providing apparatus selects a plurality of waypoints within a look-ahead distance from a current location of the vehicle on the map and obtains a regression function expressing a shape of the road on the map through a linear regression analysis on the waypoints. The current location of the vehicle is measured using, for example, a GPS sensor, an accelerometer sensor, and a compass sensor included in the information providing apparatus. The information providing apparatus determines curvature information of the road using the regression function. A method of determining curvature information of a road using the information providing apparatus will be further described with reference to FIGS. 4 and 5.

In operation 230, the information providing apparatus estimates a lateral offset of the vehicle using the lane region and a reference line that is formed from the curvature information. When the curvature information is 0, the reference line may be in a straight-line shape. When the curvature information is greater than 0, the reference line may be in a curve shape. The curve shape includes, for example, a curve shape having a curvature in one direction, a curve shape having curvatures in at least two directions, a curve shape corresponding to at least a portion of a circle, and a curve shape corresponding to at least a portion of an ellipse. The lateral offset of the vehicle corresponds to a distance between a center of the vehicle and a center of a lane in which the vehicle is driving. To generate a local path to maintain a position in a lane, the lateral offset of the vehicle may be accurately determined. A method of estimating a lateral offset of a vehicle using the information providing apparatus will be further described with reference to FIGS. 6 through 9.

In operation 240, the information providing apparatus outputs a signal including information for driving of the vehicle based on the curvature information and the lateral offset. The information providing apparatus may determine a local path of the vehicle based on the curvature information and the lateral offset. The information providing apparatus may generate the information for the driving of the vehicle based on the local path.

The information for the driving of the vehicle includes, for example, wheel steering control information, acceleration and deceleration control information associated with an accelerator and a brake of the vehicle, driving information of a detected lane, image information including a local path of a vehicle, and acoustic information that represents control information and image information represented by various sounds. The information for the driving of the vehicle is determined based on a line regression function to which the curvature information and the lateral offset are applied. The line regression function is in a form of, for example, a polynomial equation such as $c_2x^2+c_1x+c_0$, or a clothoid that is a type of a plane curve. The clothoid is a spiral whose change in curvature is inversely proportional to a length of a curve, and corresponds to a curve matching a driving trajectory of the vehicle when a steering wheel of the vehicle is rotated at a constant angular velocity.

The information providing apparatus provides driving information including a driving path image or driving path information of a vehicle based on a local path so as to be displayed in a display device such as an HUD.

Figure 3:
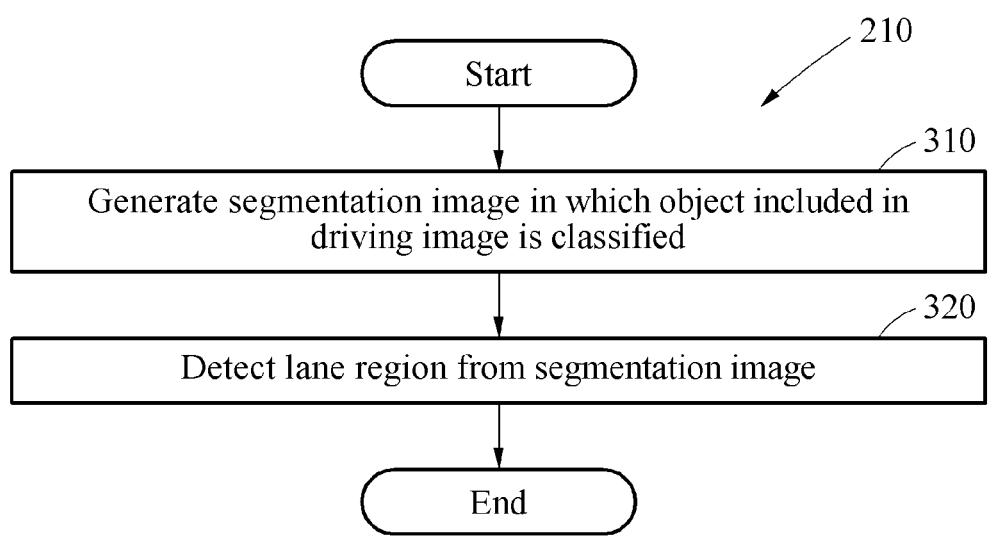
FIG. 3 illustrates an example of a method of detecting a lane region.

FIG. 3 illustrates an example of a method of detecting a lane region. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. Also, FIG. 3 will be described below with respect to an information providing apparatus, such as corresponding to the information providing apparatus of any of FIGS. 1A and 1B.

Referring to FIG. 3, in operation 310, an information providing apparatus generates a segmentation image in which an object included in a driving image is classified. The information providing apparatus generates the segmentation image by segmenting the driving image into objects included in the driving image by a semantic unit and determining the semantics of an object (a line or a road) for each segmented region by a pixel unit. The objects are classified by a class unit. A class used herein may include various semantic units, for example, a road, a vehicle, a sidewalk, a human being, an animal, sky, and a building. The segmentation image is, for example, a segmentation image 1330 of FIG. 13B. A method of generating a segmentation image using the information providing apparatus will be further described with reference to FIG. 13B.

In operation 320, the information providing apparatus detects a lane region from the segmentation image. The information providing apparatus precisely identifies where and how an element or a component of an image, for example, an object and a background, is present from a pixel-unit label included in the segmentation image. The information providing apparatus generates an image of a lane region including pixels classified as a line class. The image of the lane region detected from the segmentation image is, for example, an image 1410 of FIG. 14A.

In an example, the information providing apparatus detects the lane region from the driving image using, for example, a support vector machine (SVM), a deep neural network (DNN) and a CNN trained to recognize a lane region including lines. The CNN used herein may be trained in advance to determine a bounding box of a line to be detected from a driving image along with a type of the line to be detected.

Figure 4:
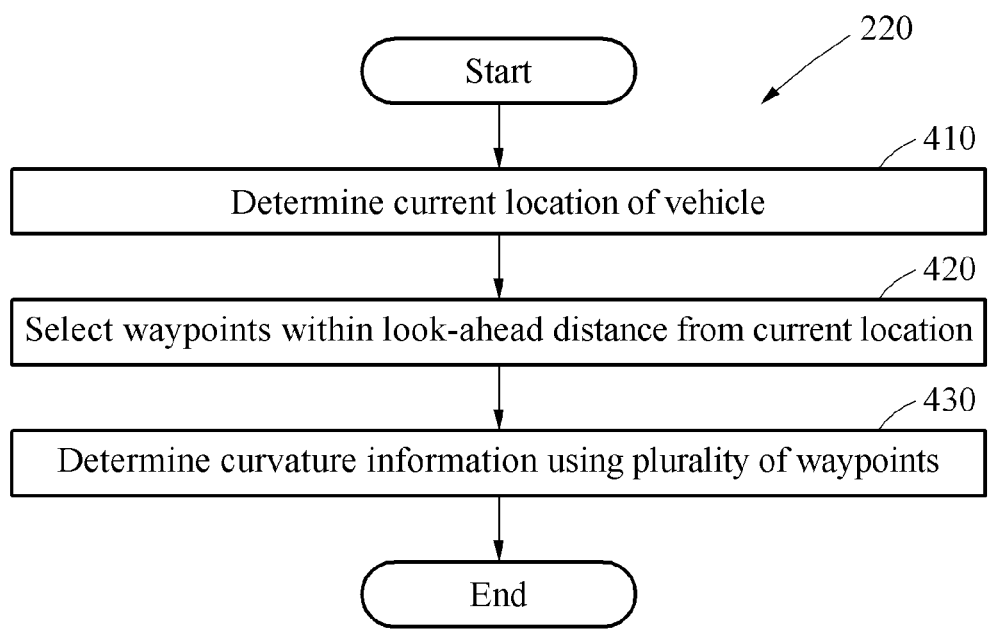
FIGS. 4 and 5 illustrate examples of a method of determining curvature information.

FIG. 4 illustrates an example of a method of determining curvature information. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. Also, FIG. 4 will be described below with respect to an information providing apparatus, such as corresponding to the information providing apparatus of any of FIGS. 1A and 1B.

Referring to FIG. 4, in operation 410, an information providing apparatus determines a current location of a vehicle. The information providing apparatus determines the current location of the vehicle based on, for example, global positioning system (GPS) information and map information. The information providing apparatus may also determine the current location of the vehicle using an odometer of the vehicle and a geomagnetic measurement value. However, the manner of locating the vehicle is not so limited. When the current location of the vehicle is determined, the information providing apparatus determines curvature information using a plurality of waypoints corresponding to the current location on a map.

In operation 420, the information providing apparatus selects waypoints within a predetermined look-ahead distance from the current location of the vehicle. The look-ahead distance may be determined based on any one or any combination of a speed of the vehicle, a visible distance, a weather, a driving situation, and a road condition, for example.

In an example, the look-ahead distance may be 50 meters (m). When a speed of the vehicle is higher than a preset speed, for example, 60 kilometers per second (km/s), the information providing apparatus may increase the look-ahead distance to be 120 m or 150 m, for example. When the speed of the vehicle is lower than the preset speed, the information providing apparatus may reduce the look-ahead distance to be 50 m or 70 m, for example. Also, when a visible distance, or the visibility, acquired from a driving image is relatively short due to fog condition, snow, or rain, the information providing apparatus may reduce the look-ahead distance. When the visible distance is relatively long, such as when there is no dust obstructing the view or when the weather is clear, the information providing apparatus may increase the look-ahead distance.

When the road condition is poor due to, for example, a severe road curvature, the information providing apparatus may reduce the look-ahead distance. When the road condition is moderate such as a smooth flat road, the information providing apparatus may increase the look-ahead distance. Also, the information providing apparatus may reduce the look-ahead distance when the driving situation is in congested traffic, such as in a rush hour, and may increase the look-ahead distance when the driving situation is in smooth traffic flow. However, embodiments are not limited thereto.

In operation 430, the information providing apparatus determines curvature information using a plurality of waypoints corresponding to the current location of the vehicle on a map. The information providing apparatus recognizes a road shape on the map based on waypoints. The information providing apparatus calculates a regression function expressing the road shape on the map through a linear regression analysis on the waypoints. The information providing apparatus recognizes the road shape on the map using the regression function and determines the curvature information based on the road shape on the map. When the regression function is a polynomial equation, for example, $c_2x^2+c_1x$, the information providing apparatus determines coefficients $C_2$, and $C_1$ to be the curvature information. For brevity, the following description will be provided based on an example in which a line regression function is a first-degree polynomial equation and a third-degree polynomial equation, and various line regression functions such as a second-degree polynomial equation, a third- or higher-degree polynomial equation, a circular equation, and an elliptic equation are also applicable thereto.

Figure 5:
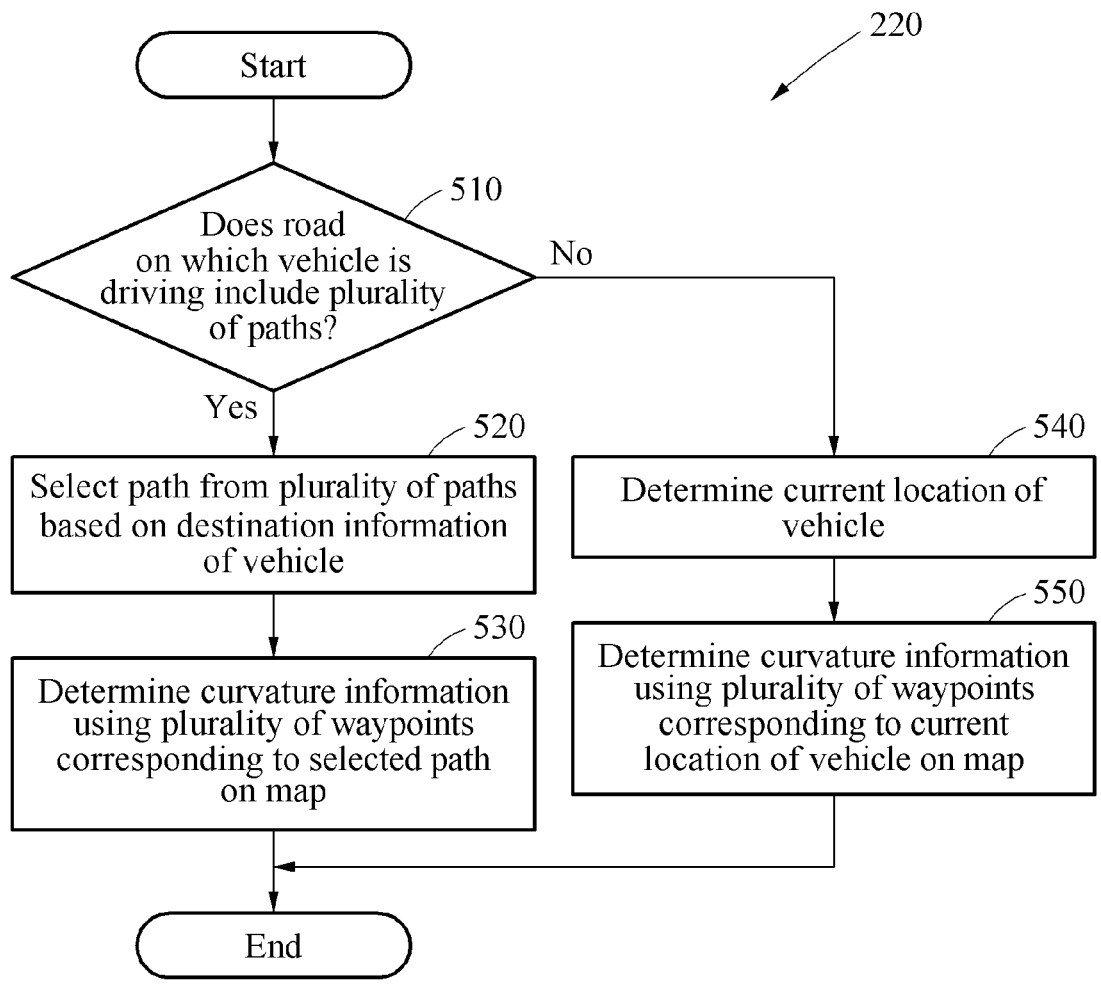

FIG. 5 illustrates an example of a method of determining curvature information when a vehicle is driving on a road including a plurality of paths such as an intersection or a returning lane. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. Also, FIG. 5 will be described below with respect to an information providing apparatus, such as corresponding to the information providing apparatus of any of FIGS. 1A and 1B.

In operation 510, an information providing apparatus determines whether a road on which a vehicle is driving includes a plurality of paths. The information providing apparatus determines whether the road on which the vehicle is driving includes the plurality of paths based on, for example, map information and GPS information.

When it is determined that the road includes the plurality of paths in operation 510, the information providing apparatus selects a path from the plurality of paths based on destination information of the vehicle in operation 520. In an example, a destination of the vehicle is a city A and a road on which the vehicle is driving includes a path toward a city B and a path toward a city C. The information providing apparatus selects the path toward the city B among the path toward the city B and the path toward the city C based on information regarding the destination corresponding to the city A.

In operation 530, the information providing apparatus determines curvature information using a plurality of waypoints corresponding to the selected path on a map.

When it is determined that the road does not include the plurality of paths in operation 510, the information providing apparatus determines a current location of the vehicle in operation 540 and determines curvature information using a plurality of waypoints corresponding to the current location of the vehicle on the map in operation 550.

Figure 6:
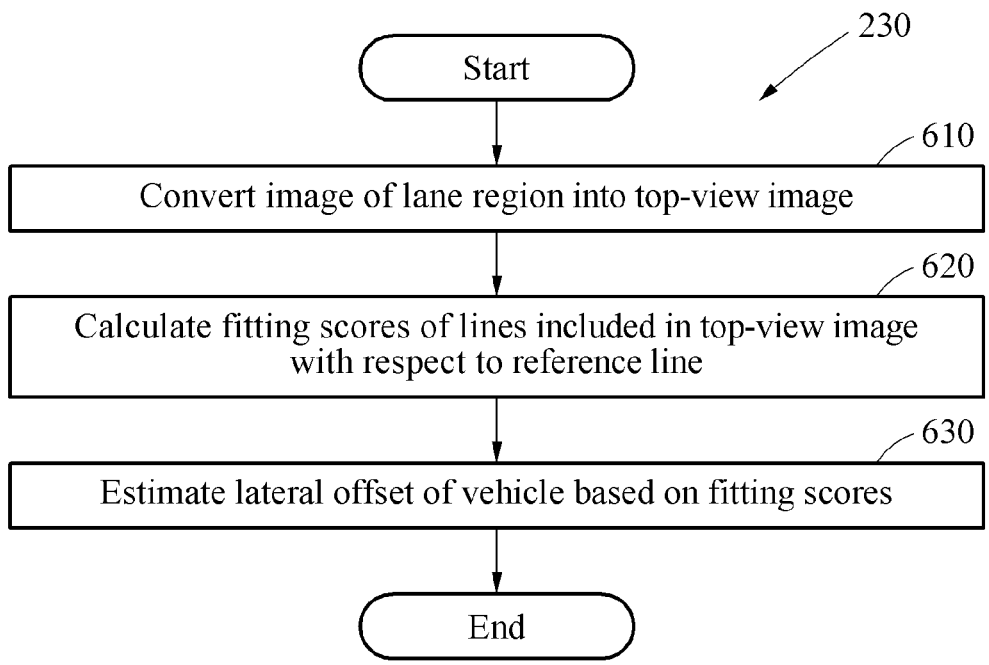
FIG. 6 illustrates an example of a method of estimating a lateral offset of a vehicle.

FIG. 6 illustrates an example of a method of estimating a lateral offset of a vehicle. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. Also, FIG. 6 will be described below with respect to an information providing apparatus, such as corresponding to the information providing apparatus of any of FIGS. 1A and 1B.

Referring to FIG. 6, in operation 610, an information providing apparatus converts an image of a lane region into a top-view image. For example, the information providing apparatus converts the image of the lane region into the top-view image by multiplying the image by a homography matrix. The top-view image is also referred to as "a bird's eye view (BEV) image." Also, the information providing apparatus may employ an inverse perspective mapping (IPM) scheme to convert the image of the lane region into the top-view image. A method of converting, by the information providing apparatus, the image of the lane region into the top-view image using the IPM scheme will be described with reference to FIGS. 13A and 13B.

In operation 620, the information providing apparatus calculates fitting scores of lines included in the top-view image with respect to a reference line. For example, the top-view image may include a first line, a second line, and a third line. In this example, the information providing apparatus calculates a fitting score of the first line with respect to the reference line and a fitting score of the second line with respect to the reference line. Likewise, the information providing apparatus calculates a fitting score of the third line with respect to the reference line. A method of calculating, by information providing apparatus, fitting scores will be further described with reference to FIG. 7.

In operation 630, the information providing apparatus estimates a lateral offset of the vehicle based on the fitting scores. A method of estimating, by the information providing apparatus, a lateral offset of a vehicle will be further described with reference to FIG. 8.

Figure 7:
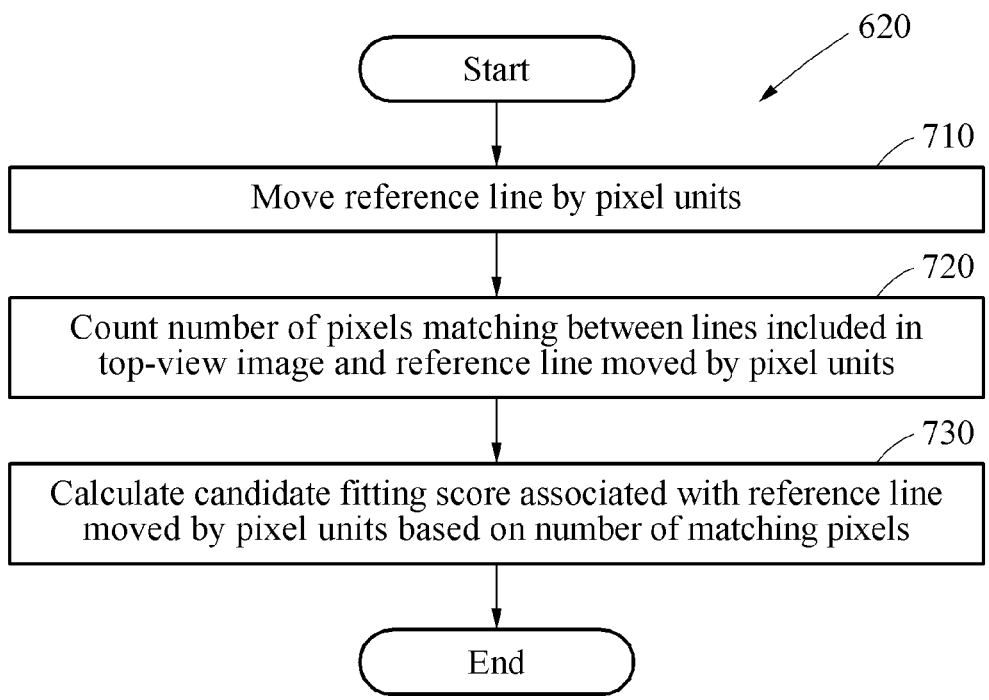
FIG. 7 illustrates an example of a method of calculating fitting scores.

FIG. 7 illustrates an example of a method of calculating fitting scores. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. Also, FIG. 7 will be described below with respect to an information providing apparatus, such as corresponding to the information providing apparatus of any of FIGS. 1A and 1B.

Referring to FIG. 7, in operation 710, an information providing apparatus moves a reference line by a predetermined number of pixel units. The information providing apparatus moves the reference line from one end of a top-view image toward the other end of the top-view image. The reference line may be moved in a horizontal direction in the top-view image by a predetermined number of pixel units. The information providing apparatus moves the reference line, for example, by one pixel, or two pixels, or three pixels.

In operation 720, the information providing apparatus counts a number of matching pixels between lines (for example, a first line, a second line, and a third line) included in the top-view image and the reference line moved by pixel units. Each of the lines included in the top-view image has a thickness corresponding to a plurality of pixels. In an example, a predetermined pixel unit by which the reference line is moved may be less than a number of pixels corresponding to the thickness of each of the lines. In this example, a matching operation may be performed on each of the lines a plurality of times.

In operation 730, the information providing apparatus calculates a candidate fitting score associated with the reference line moved by a predetermined number of pixel units based on the number of matching pixels. The candidate fitting score is a result of fitting performed based on a lateral position of the reference line moved by a predetermined number of pixel units before classifying a plurality of lines.

The information providing apparatus calculates candidate fitting scores by repetitively performing the foregoing process of FIG. 7. The information providing apparatus classifies the plurality of lines using the candidate fitting scores. When a candidate fitting score corresponding to a predetermined lateral position is greater than a threshold, a line corresponding to the lateral position is classified as a lane boundary. When a candidate fitting score corresponding to a predetermined lateral position is less than or equal to the threshold, it is recognized that a line corresponding to the lateral position is not a lane boundary. When at least a preset number (for example, one or more) of lines that are not recognized as the lane boundary are detected consecutively, it is recognized that different lines are present on left and right sides of the corresponding line.

As further described below, in response to the plurality of lines being classified, the information providing apparatus detects a lane boundary based on candidate fitting scores corresponding to lines classified as the lane boundary (hereinafter, also referred to as "fitting scores").

Figure 8:
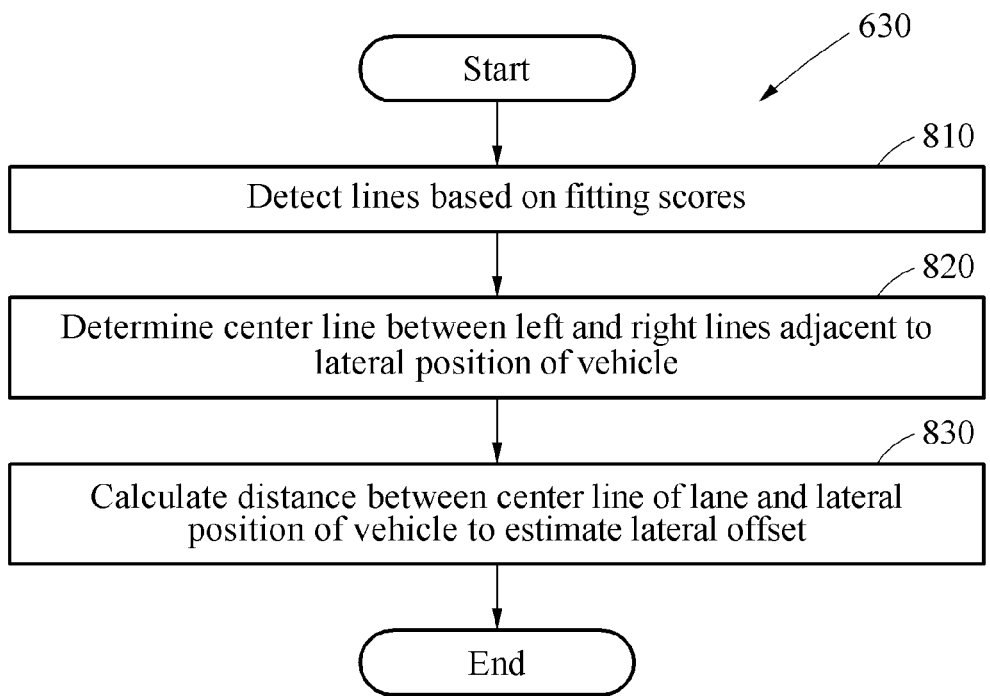
FIG. 8 illustrates an example of a method of estimating a lateral offset of a vehicle based on fitting scores.

FIG. 8 illustrates an example of a method of estimating a lateral offset of a vehicle based on fitting scores. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. Also, FIG. 8 will be described below with respect to an information providing apparatus, such as corresponding to the information providing apparatus of any of FIGS. 1A and 1B.

Referring to FIG. 8, in operation 810, an information providing apparatus detects lines based on fitting scores. A method of detecting lines using the information providing apparatus will be further described with reference to FIG. 9.

In operation 820, the information providing apparatus determines a center line between left and right lines adjacent to a lateral position of a vehicle. The information providing apparatus detects a leftward-adjacent line and a rightward-adjacent line relative to the lateral position of the vehicle in a top-view image.

In the top-view image, the lateral position of the vehicle is determined based on a lateral position of a camera attached to the vehicle to capture a driving image. In an example, the camera has a uniform horizontal field of view. In this example, it is determined that the camera is located in a middle of the top-view image in a lateral direction. When the camera is attached at a center of the vehicle, it is determined that the center of the vehicle is located at a center of the top-view image in a lateral direction. An operation performed when the camera is attached on the center of the vehicle will be described with reference to FIG. 15.

Also, when the camera is attached to be spaced apart from the center of the vehicle, the information providing apparatus may estimate a position of the center of the vehicle in the top-view image based on a location of the camera. An operation performed when the camera is attached to be spaced apart from the center of the vehicle will be described with reference to FIGS. 16A and 16B.

When the lateral position of the vehicle is determined in the top-view image, the information providing apparatus detects left and right lines adjacent to the lateral position of the vehicle. The detected lines are lines on both sides of a lane in which the vehicle is driving. The information providing apparatus determines a center line of the determined lines (for example, a center line of the lane in which the vehicle is driving).

In operation 830, the information providing apparatus calculates a distance between the center line of the lane and the lateral position of the vehicle to estimate a lateral offset.

Figure 9:
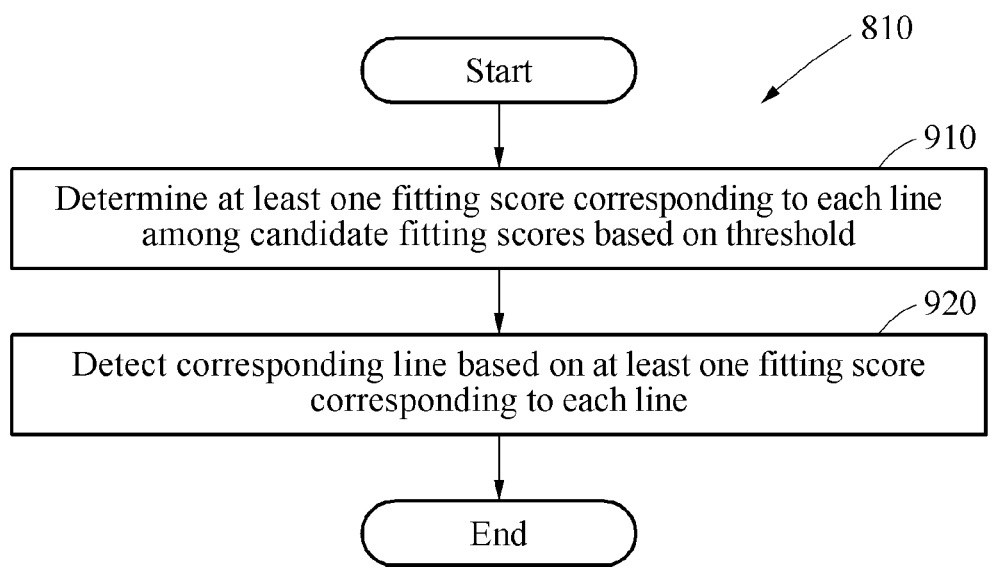
FIG. 9 illustrates an example of a method of detecting lines.

FIG. 9 illustrates an example of a method of detecting lines. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions.

Referring to FIG. 9, in operation 910, the information providing apparatus determines at least one fitting score corresponding to each line among candidate fitting scores based on a threshold. Since a single lane boundary includes a plurality of lines, each of the lines has a fitting score. The information providing apparatus selects fitting scores exceeding a threshold such that a line is detected using fitting scores corresponding to each of the lines excluding a candidate fitting score corresponding to a non-lane portion from the candidate fitting scores.

In operation 920, the information providing apparatus detects a corresponding line based on the at least one fitting score corresponding to each line.

For example, Table 1 shows offset information corresponding to candidate fitting scores of lines adjacent to a second line and lines configuring the second line. In this example, a threshold determined for the candidate fitting scores is 0.4.

TABLE 1

| | Offset information | | | | | |
|---|---|---|---|---|---|---|
| | 4 | 5 | 6 | 7 | 8 | 9 |
| Fitting score | 0.4 | 0.7 | 0.8 | 0.9 | 0.75 | 0.35 |

The information providing apparatus may discard candidate fitting scores having values less than or equal to the threshold, for example, 0.4, among the candidate fitting scores as shown in Table 1. Also, the information providing apparatus determines candidate fitting scores having values greater than 0.4 to be fitting scores corresponding to the second line.

The information providing apparatus detects a fitting score having a greatest value from at least one fitting score of a corresponding line and determines the corresponding line based on offset information corresponding to the detected fitting score. The information providing apparatus detects a fitting score (0.9) having a representative value (for example, the greatest value) from the at least one fitting score (0.7, 0.8, 0.9, 0.75) of the second line, and determines a corresponding line based on offset information (7) corresponding to the detected fitting score.

In an example, the information providing apparatus obtains a weighted sum of at least one item of offset information corresponding to the at least one fitting score using the at least one fitting score of the corresponding line as a weight. The information providing apparatus determines the corresponding line using the weighted sum. For example, the information providing apparatus obtains 20.6 (=3.5+4.8+6.3+6=(0.7×5)+(0.8×6)+(0.9×7)+(0.75×8)) as a weighted sum of the at least one item of offset information (5, 6, 7, 8) corresponding to the at least one fitting score (0.7, 0.8, 0.9, 0.75) of the second line. The information providing apparatus determines the corresponding line using an average of the weighted sum, that is, 5.15 (=20.6/4).

The method described with reference to FIG. 9 is also applied to detect a line in operation 1730 of FIG. 17.

Figure 10:
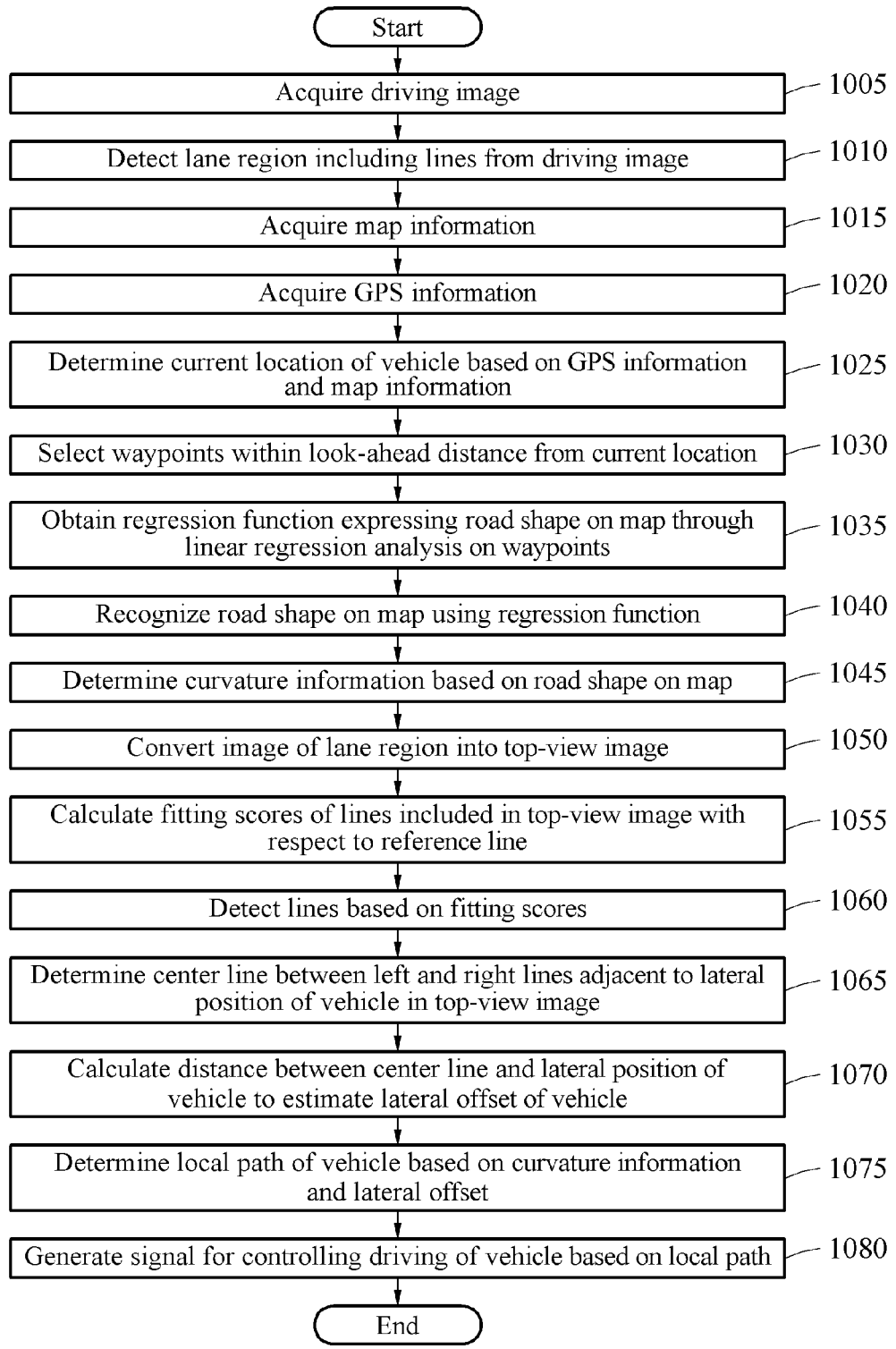
FIG. 10 illustrates an example of a method of providing information for driving of a vehicle.

FIG. 10 illustrates an example of a method of providing information for driving of a vehicle. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. Also, FIG. 10 will be described below with respect to an information providing apparatus, such as corresponding to the information providing apparatus of any of FIGS. 1A and 1B.

Referring to FIG. 10, in operation 1005, an information providing apparatus acquires a driving image. In operation 1010, the information providing apparatus detects a lane region including lines from the driving image.

In operation 1015, the information providing apparatus acquires map information. In operation 1020, the information providing apparatus acquires GPS information.

In operation 1025, the information providing apparatus determines a current location of a vehicle based on the GPS information and the map information. In operation 1030, the information providing apparatus selects waypoints within a look-ahead distance from the current location.

In operation 1035, the information providing apparatus obtains a regression function expressing a shape of the road on a map through a linear regression analysis of the waypoints.

In operation 1040, the information providing apparatus recognizes the shape of the road on the map using the regression function. The shape of the road includes, for example, a straight-line shape, a circular shape, a curve shape, and a winding 'S' shape. In operation 1045, the information providing apparatus determines curvature information based on the shape of the road on the map.

In operation 1050, the information providing apparatus converts an image of the lane region into a top-view image. In operation 1055, the information providing apparatus calculates fitting scores of lines included in the top-view image with respect to a reference line.

In operation 1060, the information providing apparatus detects lines based on the fitting scores. In operation 1065, the information providing apparatus determines a center line between left and right lines adjacent to a lateral position of the vehicle in the top-view image. In operation 1070, the information providing apparatus calculates a distance between the center line and the lateral position of the vehicle to estimate a lateral offset of the vehicle.

In operation 1075, the information providing apparatus determines a local path of the vehicle based on the curvature information and the lateral offset. In operation 1080, the information providing apparatus generates a signal for controlling the driving of the vehicle based on the local path.

Figure 11:
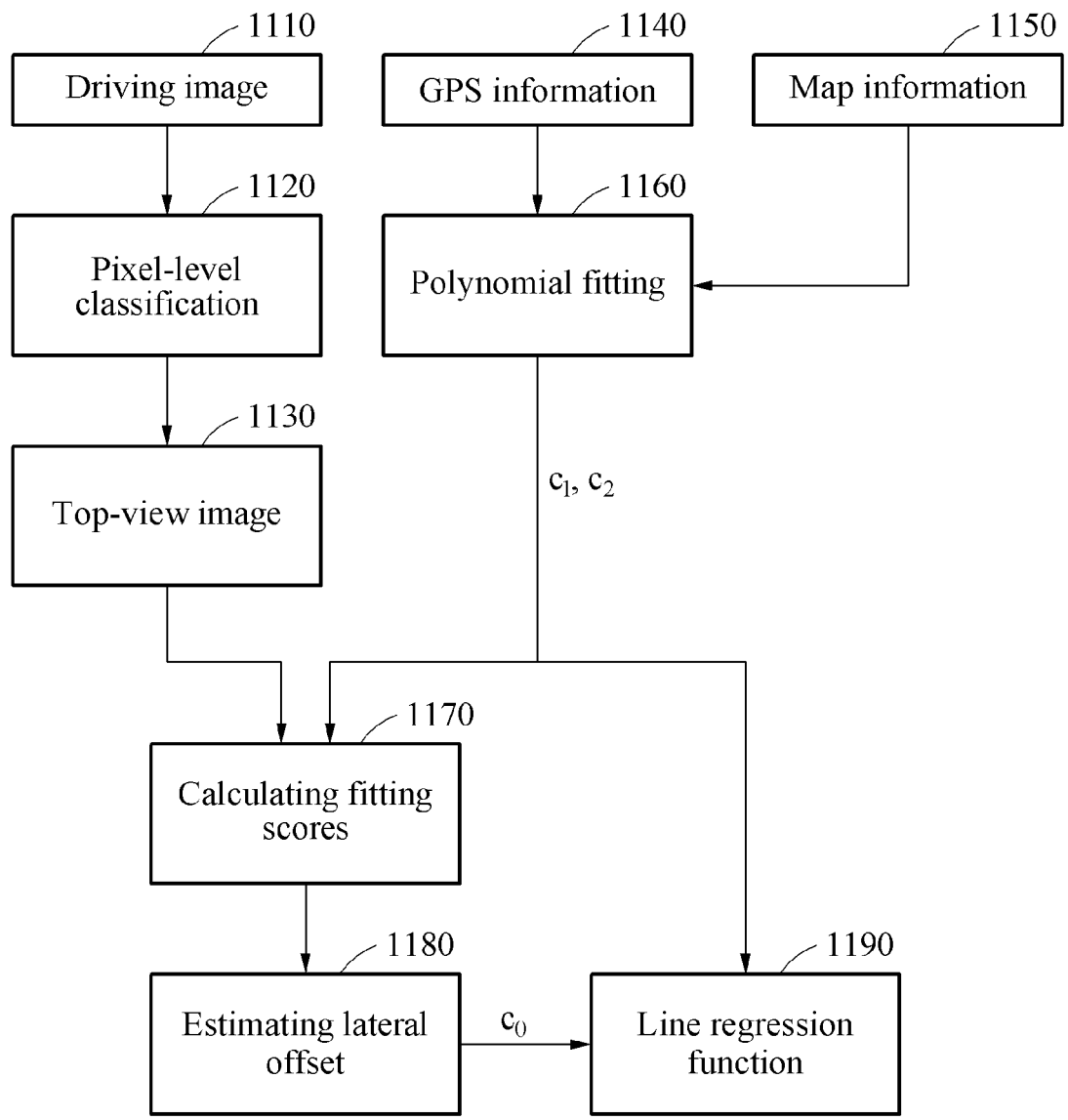
FIG. 11 illustrates an example of a method of providing information for driving of a vehicle.

FIG. 11 illustrates an example of a method of providing information for driving of a vehicle. Referring to FIG. 11, in operation 1110, an information providing apparatus acquires a driving image. In operation 1120, the information providing apparatus generates a segmentation image in which an object (or a lane region) included in the driving image is classified through classification of pixel levels. In operation 1130, the information providing apparatus converts a segmentation image in which lines are classified into a top-view image.

In an example, the information providing apparatus acquires GPS information in operation 1140 and acquires map information in operation 1150. The information providing apparatus detects a current location of the vehicle based on the GPS information and the map information, and performs polynomial fitting by collecting a plurality of waypoints adjacent to the current location of the vehicle on the map in operation 1160. For example, when a polynomial equation is $c_2x^2+c_1x+c_0$, the information providing apparatus obtains $C_1$ and $C_2$ corresponding to curvature information of a road by performing the polynomial fitting. In this example, $C_0$ obtained as a fitting result is not used or set to be zero, so that the polynomial fitting is performed.

In operation 1170, as illustrated in FIG. 11, the information providing apparatus calculates fitting scores of the lines included in the top-view image with respect to a reference line having the curvature information of $C_1$ and $C_2$ while the reference line is moved by a predetermined number of pixel units (for example, one pixel).

In operation 1180, the information providing apparatus detects lines based on the fitting scores calculated in operation 1170, determines two lines adjacent to the lateral position of the vehicle, and determines a difference between a center line of a lane in which the vehicle is driving and the lateral position of the vehicle to be a lateral offset of the vehicle. In this example, offset information corresponds to $C_0$ of the polynomial equation $$c_2x^2+c_1x+c_0.$$

In operation 1190, the information providing apparatus determines a polynomial equation using the lateral offset $C_0$ determined in operation 1180 and the curvature information $C_1$ and $C_2$ obtained in operation 1160. The determined polynomial equation corresponds to a line regression function expressing a position of the vehicle in a driving lane and a road shape based on a driving path of the vehicle. Also, the information providing apparatus uses the line regression function to generate various parameters for controlling the driving of the vehicle such as controlling an accelerator and a brake for accelerating or decelerating the vehicle, and controlling a wheel steering operation of the vehicle and output the parameters. The information providing apparatus determines a path of the vehicle using the line regression function.

A method of providing information for driving of a vehicle may also be applied to provide control information and detect a control line for a path control of a robot in a robotic system requiring precise control in various industrial environments such as a smart factory and an indoor robotic application with map information in addition to an autonomous driving system.

Figure 12:
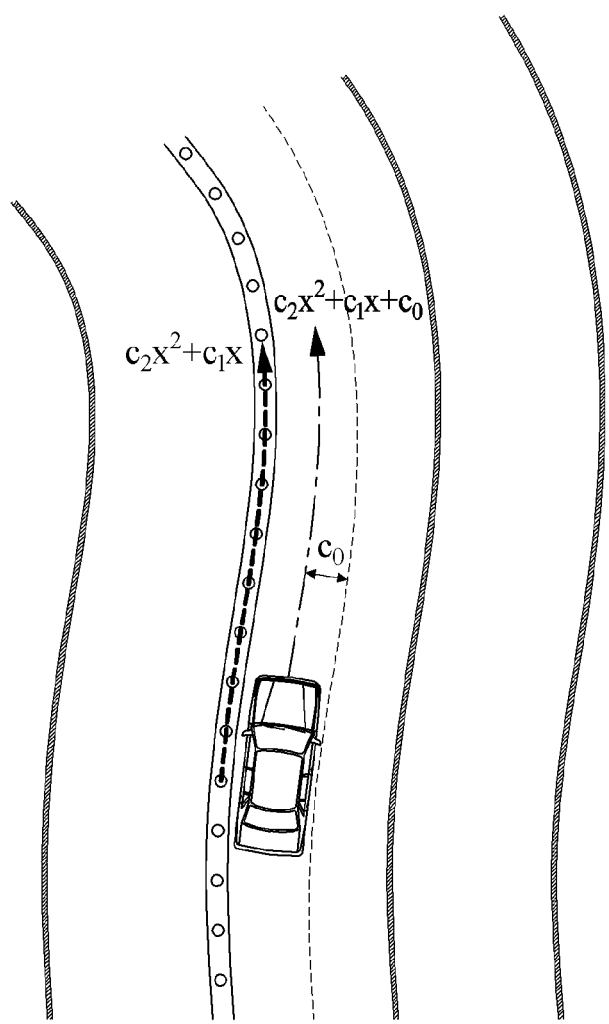
FIG. 12 illustrates an example of a line regression function.

FIG. 12 illustrates an example of a line regression function. Referring to FIG. 12, a line regression function "$c_2x^2+c_1x+c_0$" is determined by determining a lateral offset $C_0$ of a vehicle based on a reference line having curvature information $C_1$ and $C_2$.

An information providing apparatus provides information for driving of a vehicle using a line regression function based on a polynomial equation or a clothoid.

For example, the line regression function is a polynomial equation such as $c_2x^2+c_1x+c_0$ where x denotes a distance from a current location of the vehicle in a driving direction. In an example, a short-distance line is controlled based on the lateral offset information $C_0$ and a long-distance line is controlled based on the curvature information $C_1$ and $C_2$. In this example, the information providing apparatus may control a steering wheel based on a driving direction or a driving angle using a line regression function to which a road curvature and a lateral offset are applied.

The information providing apparatus may detect a lateral offset of a host vehicle based on map information thereby reducing difficulties in long-distance line detection and inducing stable control independently of a driving situation.

Figure 13A:
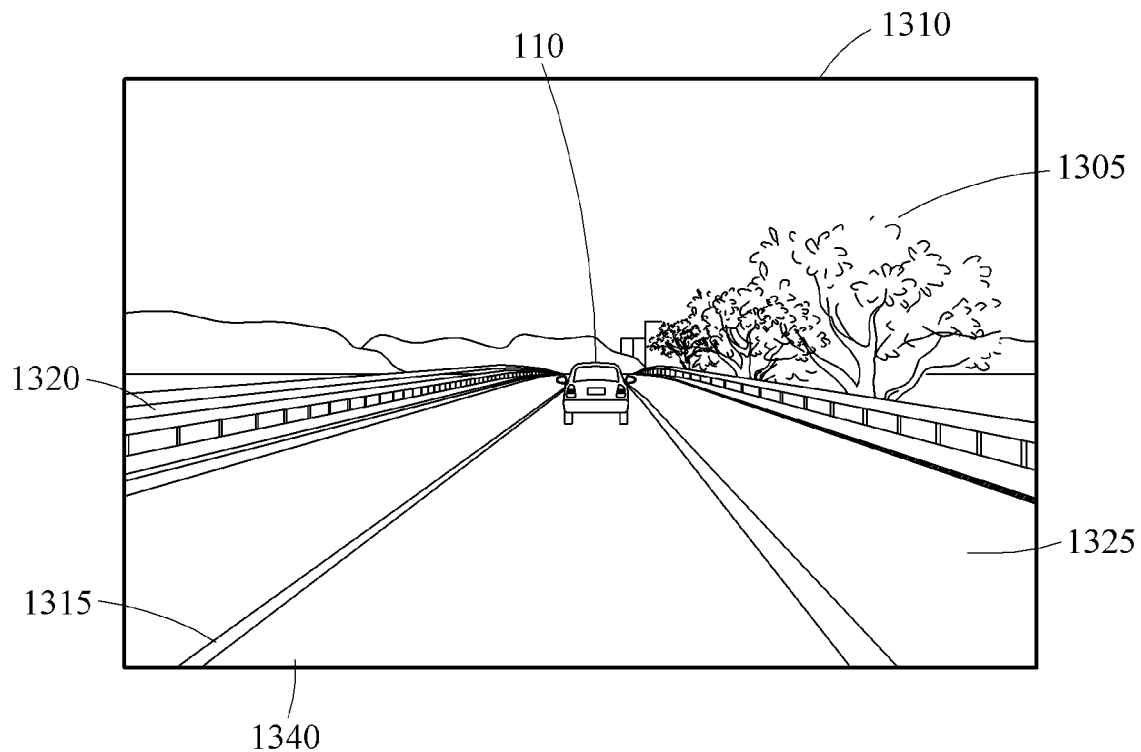
FIGS. 13A and 13B illustrate examples of a driving image and a segmentation image corresponding to the driving image.
Figure 13B:
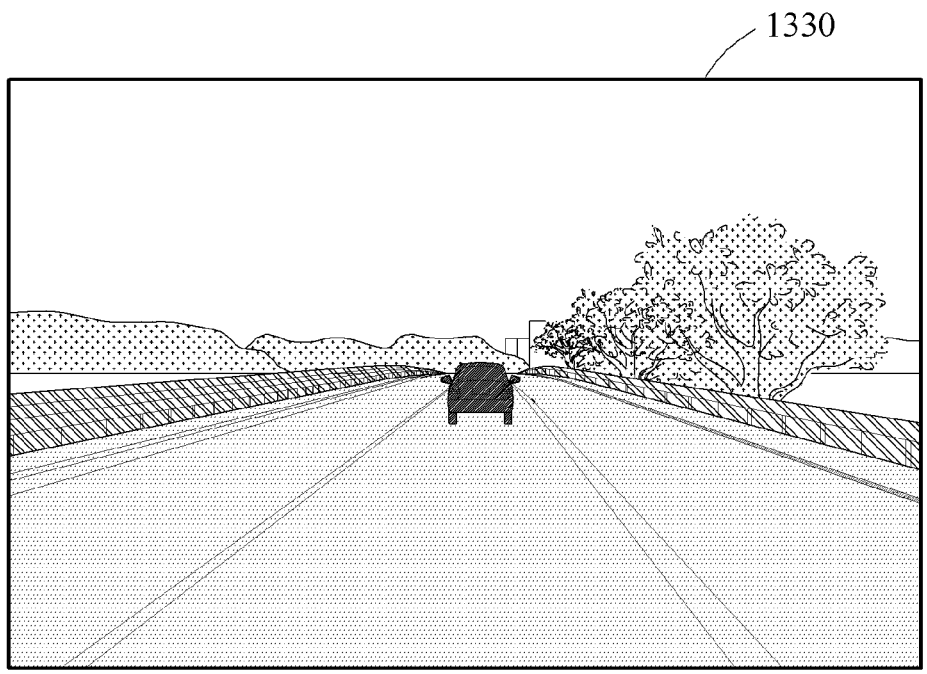

FIGS. 13A and 13B illustrate an example of a driving image and a segmentation image corresponding to the driving image. FIG. 13A illustrates the driving image 1310, and FIG. 13B illustrates the segmentation image 1330 corresponding to the driving image 1310.

The driving image 1310 includes, for example, a road image and a road surface image including a vehicle 110, a line 1315, a curbstone 1320, a sidewalk 1325, a surrounding environment 1305, and the like. The driving image 1310 includes a lane region 1340 including the vehicle 110 and lines 1315 and a surrounding environment region 1305 including a building, a tree, and the sky, for example.

Referring to FIG. 13B, the segmentation image 1330 is, for example, a semantic segmentation image. A semantic segmentation method refers to a method of densely predicting objects by a pixel unit, and outputting a pixel-unit region including an object class after determining which object is included in an image.

The information providing apparatus may generate a segmentation image through a classification network including a convolution layer in several stages and a fully connected layer. While passing through the classification network, the input image may be reduced by 1/32 in size from an original size. For such a pixel-unit dense prediction, the original size may need to be restored. The information providing apparatus may segment a driving image into a plurality of regions using a classifier model that is trained to output a training output from a training image. The classifier model may be, for example, a convolutional neural network (CNN), but is not limited thereto. For example, the training image may be a color image, and the training output may indicate a region image obtained by segmenting a training input. For example, the training output may be a region image that is segmented in advance based on an attribute or a class that is manually designated, for example, a vehicle, a human being, an object, and a background, corresponding to each pixel of the training image.

The information providing apparatus generates the segmentation image by segmenting the driving image into the objects included in the driving image by a semantic unit using a well-known classification network such as AlexNet, VGGNet, and GoogleNET, determining a semantics of each segmented region by each pixel unit, and labeling each segmented region for each class.

In an example, the information providing apparatus may distinguish between a pixel of a line class and a pixel of a class other than the line class instead of classifying classes of all pixels.

Figure 14A:
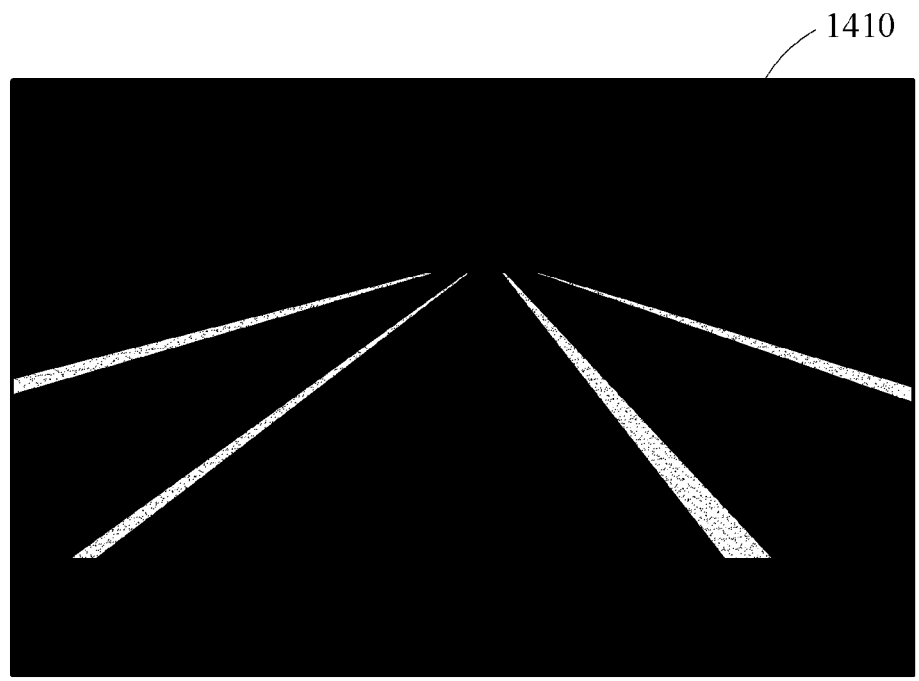
FIGS. 14A and 14B illustrate examples of a lane region image detected from a segmentation image and a top-view image into which the lane region image is converted.
Figure 14B:
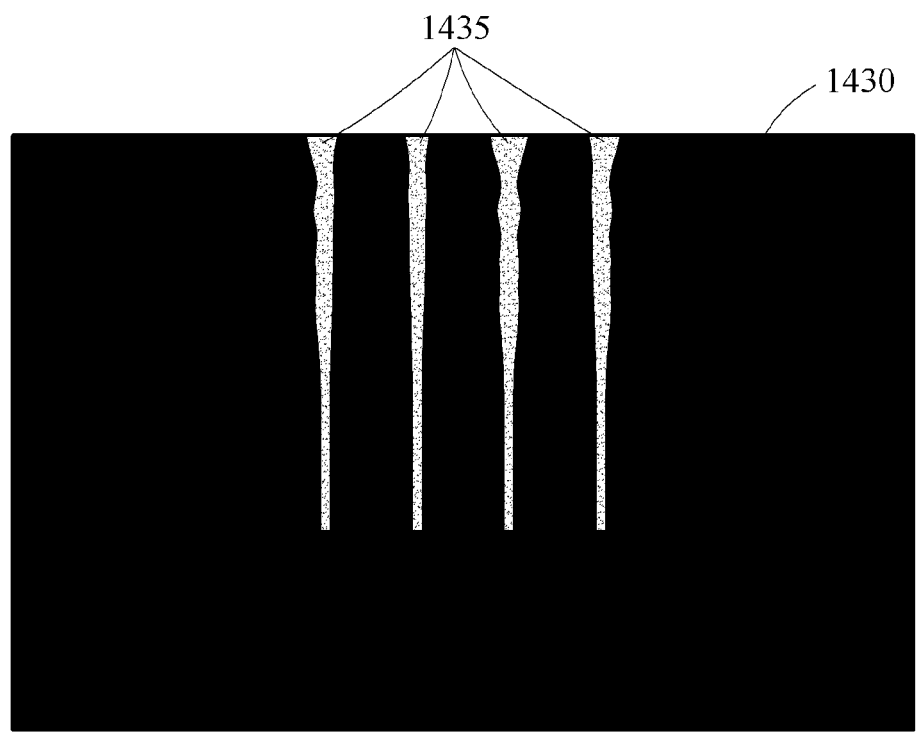

FIGS. 14A and 14B illustrate an example of a lane region image detected from a segmentation image and a top-view image into which the lane region image is converted. FIGS. 14A and 14B illustrate an image of a lane region detected from a segmentation image and a top-view image 1430 into which the image of the lane region is converted.

An information providing apparatus detects a lane region including a plurality of lines from a driving image using a pre-trained CNN. The information providing apparatus may employ various machine learning schemes to detect a lane region including a plurality of lines as represented by the image 1410.

For example, the information providing apparatus converts the image 1410 into a top-view image 1430 including lines 1435 on which top-view conversion is performed, by applying an inverse perspective transformation to the lane region including the plurality of lines. The lines 1435 are four lines, for example, a first line through a fourth line.

The driving lane identifying apparatus may obtain a top-view image by applying the inverse perspective transformation to an image of a road converging to a vanishing point, and thus determines a more uniform and clearer line. Thus, lines may be more distinguishable in the top-view image.

The inverse perspective transformation may remove a perspective effect from an input image having the perspective effect, and convert location information of an image plane to location information of a world coordinate system. Through the inverse perspective transformation, the information providing apparatus may readily indicate a relative location of a vehicle on a road defined by a normal distance from a centerline of the road to an original point of the vehicle and a direction of the vehicle based on location information of a lane indicated in the world coordinate system.

For example, the information providing apparatus applies the inverse perspective transformation only to a detected line, excluding surroundings, thereby considerably reducing an amount of computation, compared to transforming all pixels of an image.

Figure 15:
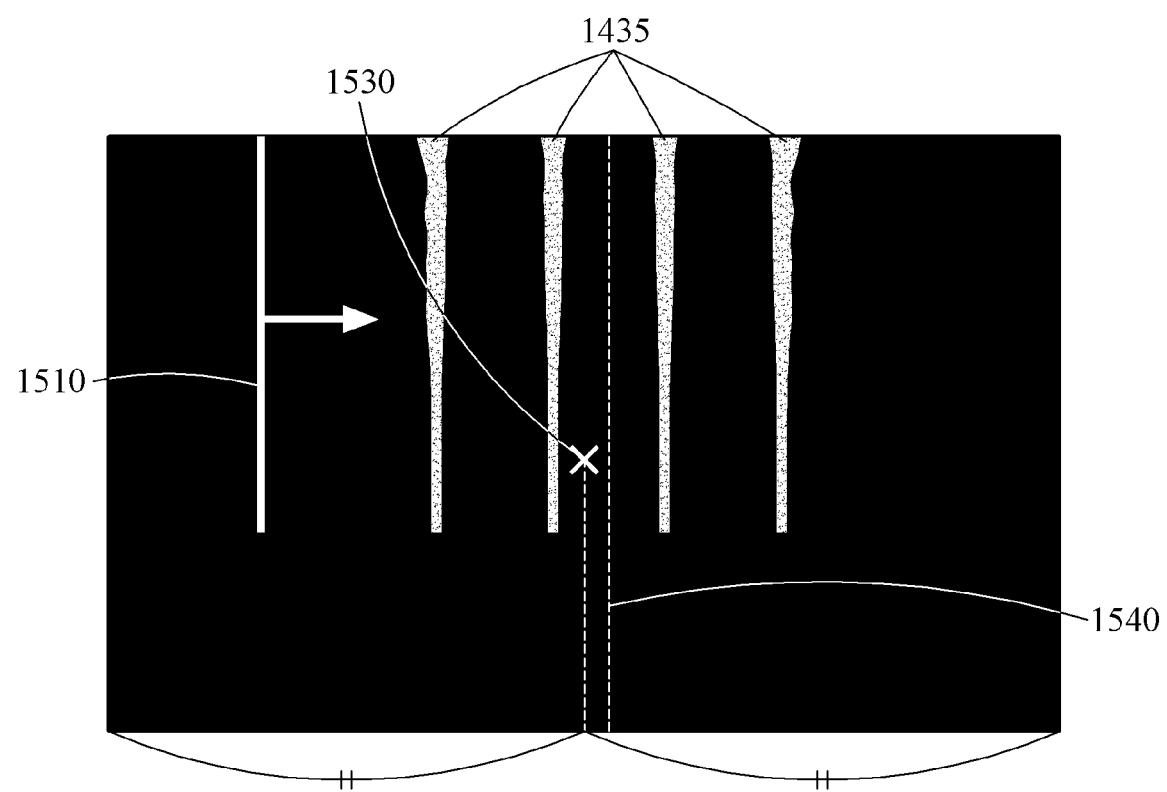
FIG. 15 illustrates an example of a method of detecting lines and detecting a lateral offset of a vehicle.

FIG. 15 illustrates an example of a method of detecting lines on the roadway and detecting a lateral offset of a vehicle. In the example of FIG. 15, a camera may be attached at a center position of a vehicle.

FIG. 15 illustrates lines 1435 on which top-view conversion is performed and a reference line 1510. A position 1530 of a vehicle, for example, a host vehicle corresponds to a laterally central position of a top-view image. Although FIG. 15 illustrates that the reference line 1510 is a straight line for ease of description, the reference line 1510 may be based on information regarding the curvature of the road, for example, $C_1$ and $C_2$ as described above.

The information providing apparatus calculates fitting scores of the lines 1435 included in the top-view image with respect to the reference line 1510. The information providing apparatus counts a number of matching pixels between the lines 1435 included in the top-view image and the reference line 1510 while moving the reference line 1510 from a left or right corner toward an opposite corner of the top-view image by a predetermined number of pixel units (for example, one pixel). The information providing apparatus determines a candidate fitting score corresponding to a lateral position of the reference line 1510 based on the number of matching pixels. The information providing apparatus determines candidate fitting scores having values greater than a threshold to be fitting scores corresponding to each line. Through this, the information providing apparatus detects the lines 1435, for example, a first line through a fourth line included in the top-view image.

The information providing apparatus determines a center line 1540 between left and right lines, for example, the second line and the third line adjacent to a lateral position 1530 of the vehicle. The information providing apparatus calculates a distance between the center line 1540 and the lateral position 1530 of the vehicle.

Figure 16B:
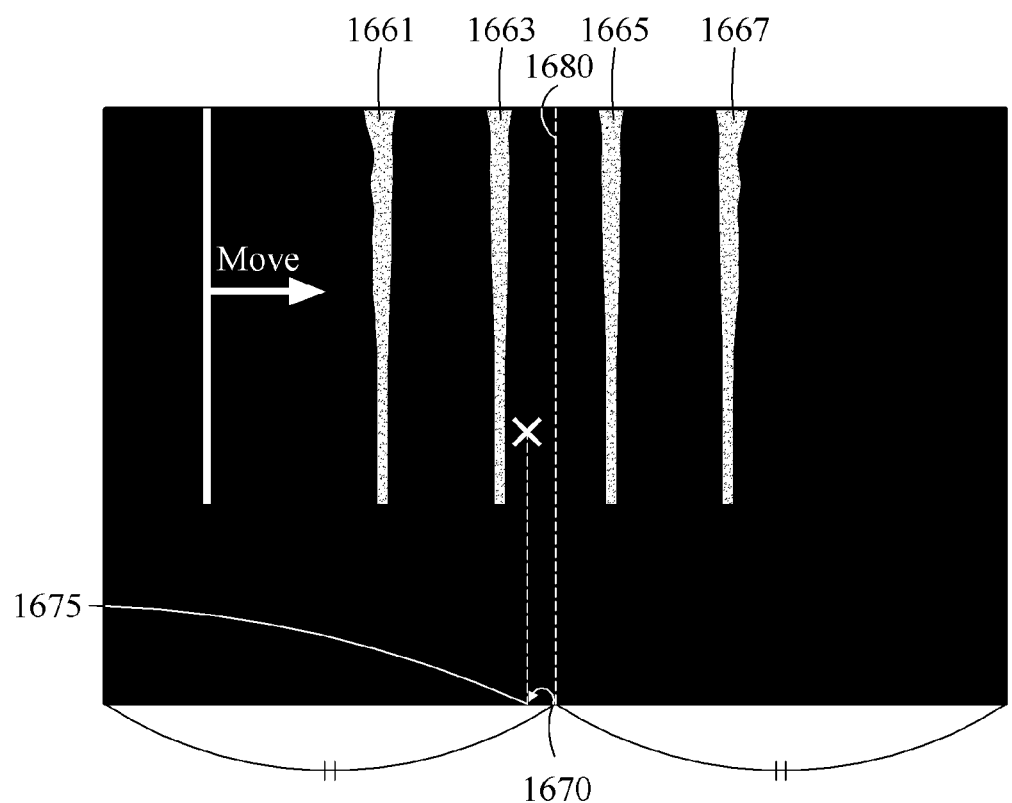

FIGS. 16A and 16B illustrate examples of a method of estimating a lateral offset of a vehicle when a camera is attached to be spaced apart from a center position of the vehicle.

Referring to FIG. 16A, when a camera 1605 for capturing a driving image is attached at a center position 1610 of a vehicle, a lateral position of the vehicle in a top-view image 1630 is a laterally central position 1640 of the top-view image 1630. When the camera 1605 is attached at a position 1620 ten centimeters (cm) spaced apart from the center position 1610 of the vehicle in a rightward direction, a lateral position of the vehicle is a position 1650 offset from the laterally central position 1640 of the top-view image 1630 in a leftward direction. The information providing apparatus determines a position corresponding to a degree (for example, 10 cm) to which the camera is offset on the top-view image 1630 based on a camera resolution and the like.

Referring to FIG. 16B, in an example, a top-view image 1660 includes four lines, that is, a first line 1661, a second line 1663, a third line 1665, and a fourth line 1667. In an example, a road has three lanes and a lateral position of a vehicle is a position 1675 which is offset in a leftward direction by, for example, 5 cm from a laterally central position 1670 of the top-view image 1660. The information providing apparatus determines a center line 1680 between left and right lines, for example, the second line 1663 and the third line 1665 adjacent to the lateral position 1675 of the vehicle. The center line 1680 corresponds to a center of a width of a lane (for example, a second lane) in which the vehicle is driving.

The information providing apparatus calculates a distance between the center line 1680 (the center of the width of the second lane) and the lateral position 1675 of the vehicle. In this example, the distance between the center line 1680 and the lateral position 1675 of the vehicle corresponds to a lateral offset.

Figure 17:
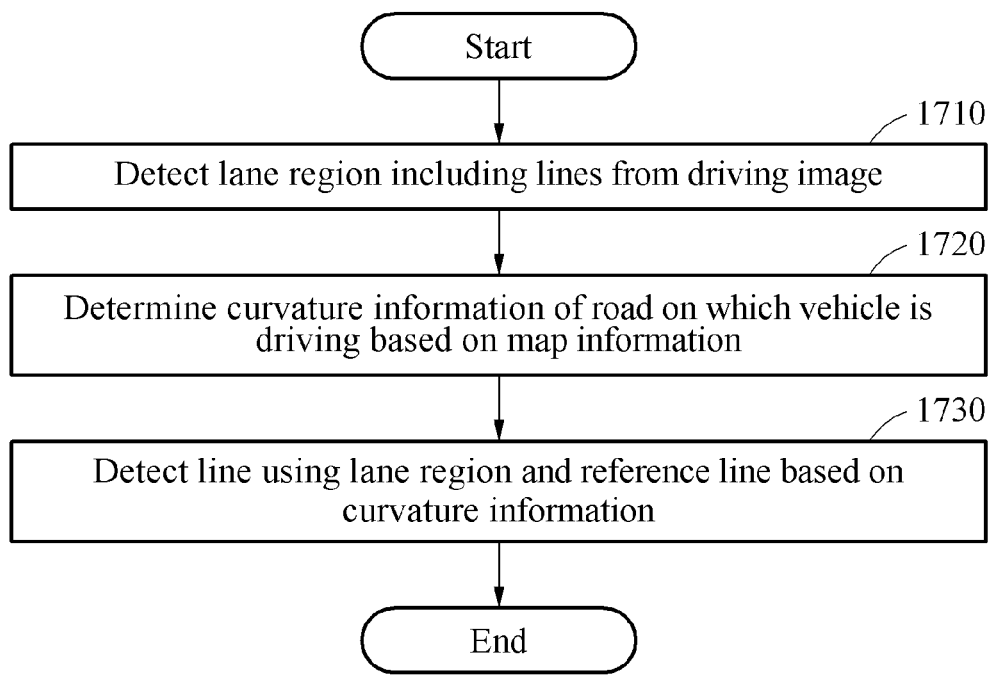
FIG. 17 illustrates an example of a method of detecting a line.

FIG. 17 illustrates an example of a method of detecting a line. The operations in FIG. 17 may be performed in the sequence and manner as shown, although the order of some operations may be changed or some of the operations omitted without departing from the spirit and scope of the illustrative examples described. Many of the operations shown in FIG. 17 may be performed in parallel or concurrently. One or more blocks of FIG. 17, and combinations of the blocks, can be implemented by special purpose hardware-based computer that perform the specified functions, or combinations of special purpose hardware and computer instructions. Also, FIG. 17 will be described below with respect to an information providing apparatus, such as corresponding to the information providing apparatus of any of FIGS. 1A and 1B.

Referring to FIG. 17, in operation 1710, an apparatus for detecting a line (hereinafter, also referred to as "detection apparatus") detects a lane region including lines from a driving image. In an example, the detection apparatus may be the information providing apparatus or an apparatus that is different from the information providing apparatus. The description of FIG. 3 is also applicable here, accordingly, repeated description of a method of detecting a lane region using the detection apparatus will be omitted.

In operation 1720, the detection apparatus determines curvature information of a road on which a vehicle is driving based on map information. The description of FIGS. 4 and 5 is also applicable here, accordingly, repeated description of a method of determining curvature information of a road using the detection apparatus will be omitted.

In operation 1730, the detection apparatus detects a line using the lane region and a reference line based on the curvature information. A method of detecting a line using the detection apparatus will be further described with reference to FIG. 18.

Figure 18:
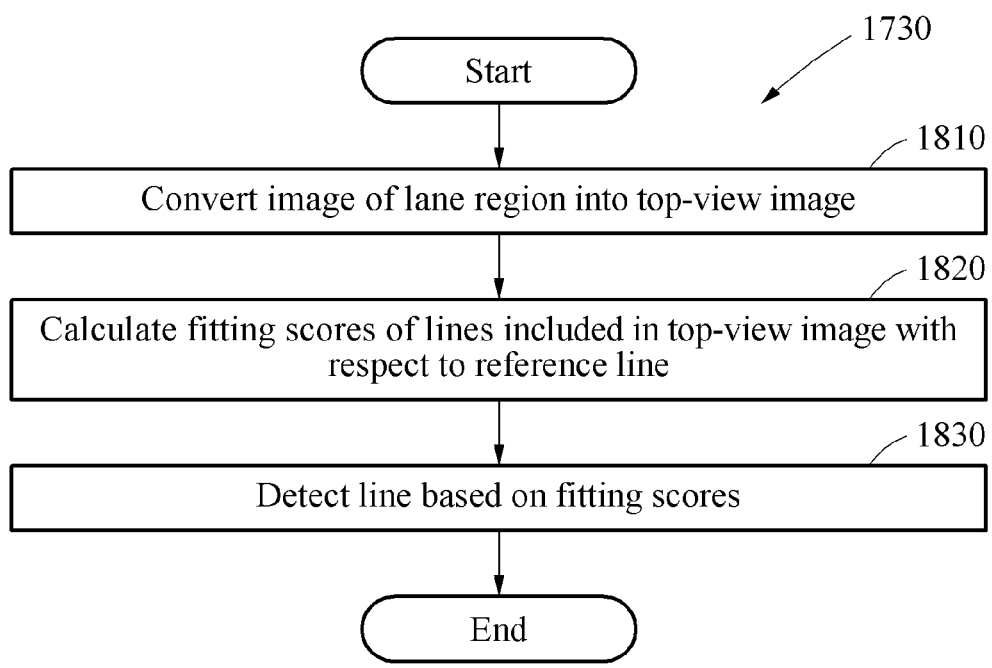
FIG. 18 illustrates an example of a method of detecting a line using a lane region and a reference line based on curvature information.

FIG. 18 illustrates an example of a method of detecting a line using a lane region and a reference line based on curvature information. The operations in FIG. 18 may be performed in the sequence and manner as shown, although the order of some operations may be changed or some of the operations omitted without departing from the spirit and scope of the illustrative examples described. Many of the operations shown in FIG. 18 may be performed in parallel or concurrently. One or more blocks of FIG. 18, and combinations of the blocks, can be implemented by special purpose hardware-based computer that perform the specified functions, or combinations of special purpose hardware and computer instructions. Also, FIG. 18 will be described below with respect to an information providing apparatus, such as corresponding to the information providing apparatus of any of FIGS. 1A and 1B.

Referring to FIG. 18, in operation 1810, a detection apparatus converts an image of a lane region into a top-view image. Since the description of FIG. 14 and operation 610 of FIG. 6 is applicable here, repeated description of a method of converting the image of the lane region into the top-view image using the detection apparatus will be omitted.

In operation 1820, the detection apparatus calculates fitting scores of lines included in the top-view image with respect to a reference line. The description of FIG. 7 is also applicable here, accordingly, repeated description of a method of calculating fitting score using the detection apparatus will be omitted.

In operation 1830, the detection apparatus detects a line based on the fitting scores. The description of FIG. 9 is also applicable here, accordingly, repeated description of a method of detecting a line using the detection apparatus will be omitted.

Figure 19:
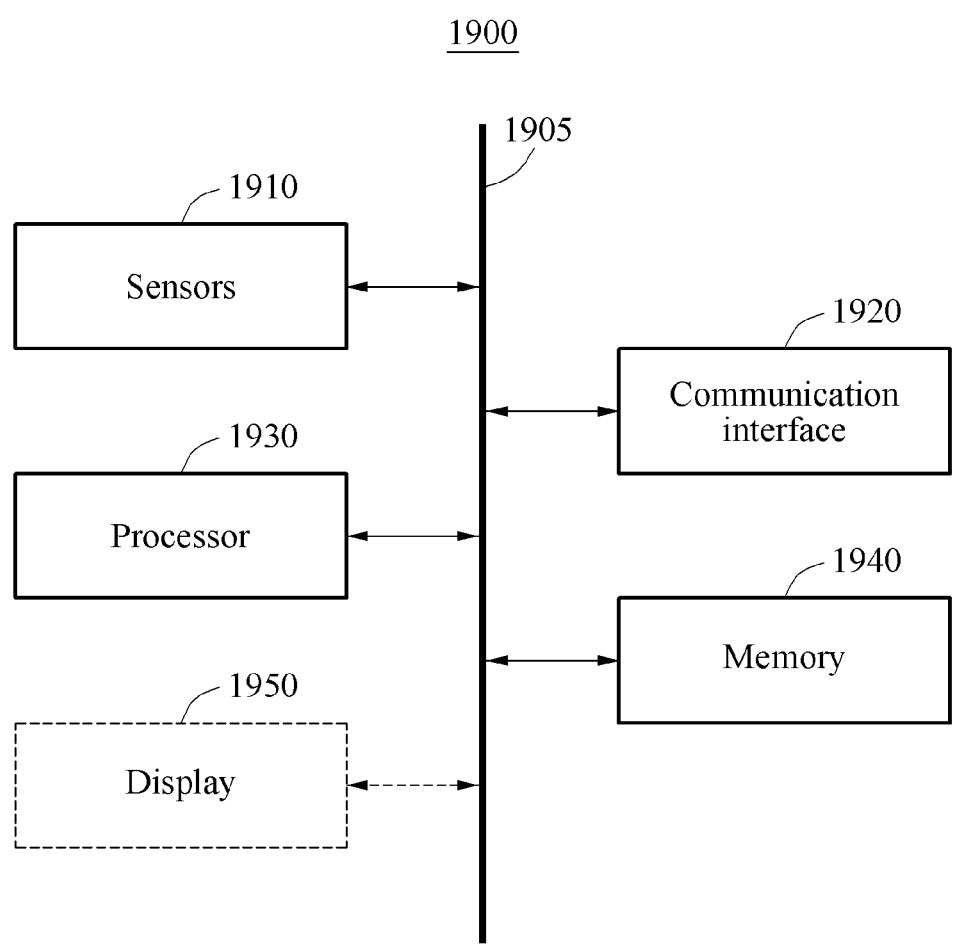
FIG. 19 illustrates an example of an apparatus for providing information for driving of a vehicle or detecting a line.

FIG. 19 illustrates an example of an apparatus that provides information for driving of a vehicle or detects a line. Referring to FIG. 19, an apparatus 1900 includes a processor 1930. The apparatus 1900 further includes sensors 1910, the communication interface 1920, the memory 1940, and a display 1950.

The sensors 1910, the communication interface 1920, the processor 1930, the memory 1940, and the display 1950 communicate with one another through a communication bus 1905. The sensors 1910 include, for example, an image sensor, an accelerometer sensor, a compass sensor, a GPS sensor, a gyro sensor, an odometer, and a geomagnetic sensor.

The apparatus 1900 may receive sensing information through the communication interface 1920. In an example, the communication interface 1920 may receive sensing information from other sensors external to the apparatus 1900. In another example, the communication interface 1920 may receive a driving image, map information, and GPS information from an external source of the apparatus 1900.

The processor 1930 outputs a signal including information for driving of a vehicle through the communication interface 1920.

The processor 1930 detects a lane region including lines from a driving image. The processor 1930 determines curvature information of a road on which the vehicle is driving based on map information. The processor 1930 estimates a lateral offset of the vehicle or detects a line using the lane region and a reference line that is determined based on the curvature information. The processor 1930 outputs a signal including the information for the driving of the vehicle based on the curvature information and the lateral offset.

The processor 1930 performs at least one of the methods described with reference to FIG. 1 through 18 or an algorithm corresponding to at least one of the methods.

The term "processor," as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA).

The processor 1930 executes a program and controls the apparatus 1900. Codes of the program executed by the processor 1930 are stored in the memory 1940.

The memory 1940 stores the driving image and the map information. The memory 1940 stores various information generated during a processing operation of the processor 1930. Also, the memory 1940 includes a variety of data and programs. The memory 1940 includes a volatile memory or a non-volatile memory. The memory 1940 includes a large-capacity storage medium such as a hard disk to store the variety of data.

The display 1950 displays the line detected by the processor 1930 and the map information separately or together.

The respective information providing apparatus 110, the sensors 1910, communication interface 1920, processor 1930, memory 1940, and display 1950, for example, and other components described herein with respect to FIGS. 1-18 that perform the operations described in this application are implemented by hardware components, and other apparatuses, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-18 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of acquiring outside situation information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method comprising:
   detecting a lane region including lane demarcation lines from a driving image;
   determining curvature information of a road on which a vehicle is driving based on map information;
   estimating a lateral offset of the vehicle based on the lane region and a reference line having the curvature information; and
   outputting a signal including information for driving the vehicle based on the curvature information and the lateral offset,
   wherein the determining curvature information comprises:
      performing a linear regression analysis on a plurality of waypoints located on an edge of the road, wherein the plurality of waypoints are located within a point adjacent to a current location of the vehicle and another point away from the point adjacent to the current location of the vehicle by a look-ahead distance;
      obtaining a regression function corresponding to a shape of the road based on the linear regression analysis; and
      determining the curvature information corresponding to coefficients of the regression function, using the regression function.

2. The method of claim 1, wherein the detecting of the lane region comprises:
   classifying an object included in the driving image;
   generating a segmentation image in which the object included in the driving image is classified; and
   detecting the lane region from the segmentation image.

3. The method of claim 1, wherein the determining of the curvature information comprises:
   determining the current location of the vehicle.

4. The method of claim 1, wherein the look-ahead distance is determined based on any one or any combination of a speed of the vehicle, a visible distance, a weather condition, a driving condition, and a condition of the road.

5. The method of claim 1, wherein the determining of the curvature information comprises:
   selecting, when the road on which the vehicle is driving includes a plurality of paths, a path based on destination information of the vehicle; and
   determining the curvature information of the road corresponding to the path.

6. The method of claim 1, wherein the estimating of the lateral offset of the vehicle comprises:
   converting an image of the lane region into a top-view image;
   calculating polynomial fitting scores of lines included in the top-view image with respect to the reference line; and
   estimating the lateral offset of the vehicle based on the polynomial fitting scores.

7. The method of claim 6, wherein the calculating of the polynomial fitting scores comprises:
   calculating, while moving the reference line by a predetermined number of pixel units, candidate fitting scores in response to the reference line being moved, by counting a number of matching pixels between the lines included in the top-view image and the reference line.

8. The method of claim 7, wherein the calculating of the candidate fitting scores comprises:
   moving the reference line by the predetermined number of pixel units;
   counting matching pixels between the lines included in the top-view image and the reference line moved by the predetermined number of pixel units; and
   calculating a candidate fitting score associated with the reference line based on the matching pixels.

9. The method of claim 6, wherein the estimating of the lateral offset of the vehicle comprises:
  detecting a left line and a right line of a lane of the road on which the vehicle is driving based on the polynomial fitting scores; and
  calculating the lateral offset based on a lateral position of the vehicle between the left line and the right line of the lane of the road on which the vehicle is driving in the top-view image.

10. The method of claim 9, wherein the detecting the left line and the right line comprises:
  determining at least one polynomial fitting score corresponding to each line among the polynomial fitting scores based on a threshold; and
  detecting a corresponding line based on the at least one polynomial fitting score corresponding to each line.

11. The method of claim 10, wherein the detecting of the corresponding line comprises:
  detecting a polynomial fitting score having a highest value from at least one polynomial fitting score of the corresponding line; and
  determining the corresponding line based on offset information corresponding to the polynomial fitting score.

12. The method of claim 10, wherein the detecting of the corresponding line comprises:
  obtaining a weighted sum of at least one item of offset information corresponding to the at least one polynomial fitting score based on at least one polynomial fitting score of the corresponding line as a weight; and
  determining the corresponding line based on the weighted sum.

13. The method of claim 9, wherein the calculating of the lateral offset comprises:
  determining a center of the lane of the road on which the vehicle is driving between the left line and the right line of the lane of the road on which the vehicle is driving adjacent to the lateral position of the vehicle; and
  calculating the look-ahead distance between the center of the lane of the road on which the vehicle is driving and the center of the vehicle.

14. The method of claim 9, wherein the lateral position of the vehicle in the top-view image includes a laterally central position of the top-view image.

15. The method of claim 9, wherein the lateral position of the vehicle in the top-view image is determined based on a lateral position of a camera attached to the vehicle to capture the driving image.

16. The method of claim 1, wherein the outputting of the signal including the information for the driving the vehicle comprises:
  determining a local path of the vehicle based on the curvature information and the lateral offset; and
  generating the signal for controlling the driving of the vehicle based on the local path.

17. The method of claim 1, wherein the outputting of the signal including the information for the driving of the vehicle comprises:
  determining a local path of the vehicle based on the curvature information and the lateral offset; and
  providing driving information including a driving path of the vehicle based on the local path.

18. The method of claim 1, further comprising:
  acquiring the driving image; and
  acquiring the map information.

19. A non-transitory computer-readable storage medium storing instructions that, when executed by a processor, cause the processor to perform the method of claim 1.

20. An apparatus comprising:
  a processor configured to:
    detect a lane region including lane demarcation lines from a driving image,
    perform a linear regression analysis on a plurality of waypoints located on an edge of a road, wherein the plurality of waypoints are located within a point adjacent to a current location of a vehicle and another point away from the point adjacent to the current location of the vehicle by a look-ahead distance,
    obtain a regression function corresponding to a shape of the road based on the linear regression analysis,
    determine curvature information corresponding to coefficients of the regression function, using the regression function,
    estimate a lateral offset of the vehicle based on the lane region and a reference line having the curvature information, and
    output a signal including information for driving the vehicle based on the curvature information and the lateral offset.

21. A method comprising:
  detecting a lane region on a road with a camera sensor;
  determining a current location of the vehicle with a GPS sensor;
  performing a linear regression analysis on a plurality of waypoints located on an edge of the road, wherein the plurality of waypoints are located within a point adjacent to the current location of a vehicle and another point away from the point adjacent to the current location of the vehicle by a look-ahead distance;
  obtaining a regression function corresponding to a shape of the road based on the linear regression analysis;
  determining curvature information corresponding to coefficients of the regression function, using the regression function;
  determining an offset of the vehicle from a center of the lane region based on the curvature information; and
  controlling driving of the vehicle based on the determined offset and the curvature information.

22. The method of claim 21, wherein the center of the lane region is a center line of the road.

23. The method of claim 21, wherein the curvature information is obtained by performing a linear regression analysis on the plurality of waypoints of the road.

* * * * *